United States Patent
Gharavi et al.

(10) Patent No.: US 11,689,276 B2
(45) Date of Patent: *Jun. 27, 2023

(54) ACTIVE REPEATER DEVICE SHARED BY MULTIPLE SERVICE PROVIDERS TO FACILITATE COMMUNICATION WITH CUSTOMER PREMISES EQUIPMENT

(71) Applicant: Movandi Corporation, Irvine, CA (US)

(72) Inventors: Sam Gharavi, Irvine, CA (US); Ahmadreza Rofougaran, Newport Beach, CA (US); Michael Boers, South Turramurra (AU); Seunghwan Yoon, Irvine, CA (US); Kartik Sridharan, San Diego, CA (US); Donghyup Shin, Irvine, CA (US); Farid Shirinfar, Granada Hills, CA (US); Stephen Wu, Fountain Valley, CA (US); Maryam Rofougaran, Rancho Palos Verdes, CA (US)

(73) Assignee: Movandi Corporation, Irvine, CA (US)

( * ) Notice: Subject to any disclaimer, the term of this patent is extended or adjusted under 35 U.S.C. 154(b) by 40 days.

This patent is subject to a terminal disclaimer.

(21) Appl. No.: 17/209,030

(22) Filed: Mar. 22, 2021

(65) Prior Publication Data
US 2021/0211183 A1    Jul. 8, 2021

Related U.S. Application Data

(63) Continuation of application No. 16/689,758, filed on Nov. 20, 2019, now Pat. No. 11,082,123, which is a
(Continued)

(51) Int. Cl.
*H04B 7/155*    (2006.01)
*H04W 52/24*    (2009.01)
(Continued)

(52) U.S. Cl.
CPC ....... *H04B 7/15514* (2013.01); *H04B 7/0413* (2013.01); *H04B 7/0617* (2013.01);
(Continued)

(58) Field of Classification Search
CPC ............. H04B 7/15514; H04B 7/0413; H04B 7/0617; H04B 7/15; H04B 7/1555;
(Continued)

(56) References Cited

U.S. PATENT DOCUMENTS

| 4,799,062 A | 1/1989 | Sanderford et al. |
| 5,724,337 A | 3/1998 | Kawano et al. |

(Continued)

OTHER PUBLICATIONS

Corrected Notice of Allowance for U.S. Appl. No. 16/204,397 dated Apr. 28, 2021.
(Continued)

*Primary Examiner* — Linda Wong
(74) *Attorney, Agent, or Firm* — Chip Law Group

(57) ABSTRACT

An active repeater device including a first antenna array, a controller, and one or more secondary sectors receives or transmits a first beam of input RF signals from or to, respectively, a first base station operated by a first service provider and a second beam of input RF signals from or to, respectively, a second base station operated by a second service provider. A controller assigns a first beam setting to a first group of customer premises equipment (CPEs) and a second beam setting to a second group of CPEs, based on one or more corresponding signal parameters associated with the each corresponding group of CPEs. A second antenna array of the second RH unit concurrently transmits or received a first beam of output RF signals to or from the first group of CPEs and a second beam of output RF signals to the second group of CPEs.

20 Claims, 16 Drawing Sheets

Related U.S. Application Data continuation of application No. 16/032,668, filed on Jul. 11, 2018, now Pat. No. 10,630,373.

(60) Provisional application No. 62/531,161, filed on Jul. 11, 2017.

(51) Int. Cl.

| | |
|---|---|
| *H04B 7/06* | (2006.01) |
| *H04B 17/318* | (2015.01) |
| *H04B 7/0413* | (2017.01) |
| *H04B 7/15* | (2006.01) |
| *H04L 5/00* | (2006.01) |
| *H04B 7/204* | (2006.01) |
| *H04B 7/165* | (2006.01) |
| *H04W 52/46* | (2009.01) |
| *H04L 5/14* | (2006.01) |

(52) U.S. Cl.
CPC .............. *H04B 7/15* (2013.01); *H04B 7/1555* (2013.01); *H04B 7/165* (2013.01); *H04B 7/2041* (2013.01); *H04B 17/318* (2015.01); *H04W 52/245* (2013.01); *H04W 52/46* (2013.01); *H04L 5/0023* (2013.01); *H04L 5/14* (2013.01)

(58) Field of Classification Search
CPC .... H04B 7/165; H04B 7/2041; H04B 17/318; H04B 7/15528; H04W 52/245; H04W 52/46; H04L 5/0023; H04L 5/14
See application file for complete search history.

(56) References Cited

U.S. PATENT DOCUMENTS

| | | |
|---|---|---|
| 6,731,904 B1 | 5/2004 | Judd |
| 7,079,079 B2 | 7/2006 | Jo et al. |
| 7,363,058 B2 | 4/2008 | Gustaf |
| 7,480,486 B1 | 1/2009 | Oh et al. |
| 7,675,465 B2 | 3/2010 | Doan et al. |
| 7,679,576 B2 | 3/2010 | Riedel et al. |
| 7,715,466 B1 | 5/2010 | Oh et al. |
| 8,045,638 B2 | 10/2011 | Grant et al. |
| 9,130,262 B2 | 9/2015 | Park et al. |
| 9,178,546 B1 | 11/2015 | Klemes |
| 9,277,510 B2 | 3/2016 | Helmersson et al. |
| 10,080,274 B2 | 9/2018 | Johnson |
| 10,103,853 B2 | 10/2018 | Moshfeghi |
| 10,199,717 B2 | 2/2019 | Rofougaran et al. |
| 10,320,090 B2 | 6/2019 | Zou et al. |
| 10,355,720 B2 | 7/2019 | Shattil |
| 10,389,041 B2 | 8/2019 | Yoon et al. |
| 10,560,179 B2 | 2/2020 | Gharavi et al. |
| 10,854,995 B2 | 12/2020 | Rofougaran et al. |
| 10,965,411 B2 | 3/2021 | Moshfeghi |
| 11,018,816 B2 | 5/2021 | Moshfeghi |
| 11,056,764 B2 | 7/2021 | Rofougaran et al. |
| 11,075,724 B2 | 7/2021 | Moshfeghi |
| 11,088,756 B2 | 8/2021 | Gharavi et al. |
| 11,128,415 B2 | 9/2021 | Moshfeghi |
| 11,342,968 B2 | 5/2022 | Yoon et al. |
| 11,394,128 B2 | 7/2022 | Rofougaran et al. |
| 2004/0204114 A1 | 10/2004 | Brennan et al. |
| 2005/0088260 A1 | 4/2005 | Ajioka et al. |
| 2005/0134517 A1 | 6/2005 | Gotti |
| 2005/0136943 A1 | 6/2005 | Banerjee et al. |
| 2006/0040615 A1 | 2/2006 | Mohamadi |
| 2006/0063487 A1 | 3/2006 | Cleveland et al. |
| 2006/0170595 A1 | 8/2006 | Gustaf |
| 2006/0205342 A1 | 9/2006 | McKay et al. |
| 2007/0001924 A1 | 1/2007 | Hirabayashi |
| 2008/0207259 A1 | 8/2008 | Rofougaran |
| 2009/0046624 A1 | 2/2009 | Martinez et al. |
| 2009/0066590 A1 | 3/2009 | Kamada et al. |
| 2009/0092120 A1 | 4/2009 | Goto et al. |
| 2009/0156227 A1 | 6/2009 | Frerking et al. |
| 2009/0175214 A1 | 7/2009 | Sfar et al. |
| 2009/0191910 A1 | 7/2009 | Athalye et al. |
| 2010/0159859 A1 | 6/2010 | Rofougaran |
| 2010/0167639 A1 | 7/2010 | Ranson et al. |
| 2010/0284446 A1 | 11/2010 | Mu et al. |
| 2011/0109507 A1 | 5/2011 | Warnick |
| 2011/0159801 A1 | 6/2011 | Maltsev et al. |
| 2011/0190005 A1 | 8/2011 | Cheon et al. |
| 2011/0294415 A1 | 12/2011 | Jeon et al. |
| 2012/0003925 A1 | 1/2012 | Coldrey et al. |
| 2012/0149300 A1 | 6/2012 | Forster |
| 2013/0003645 A1 | 1/2013 | Shapira et al. |
| 2013/0034128 A1 | 2/2013 | Gore et al. |
| 2013/0039342 A1 | 2/2013 | Kazmi |
| 2013/0072112 A1 | 3/2013 | Gunnarsson et al. |
| 2013/0072113 A1 | 3/2013 | Lee et al. |
| 2013/0122802 A1 | 5/2013 | Wang et al. |
| 2013/0149300 A1 | 6/2013 | Hiatt et al. |
| 2014/0077875 A1 | 3/2014 | Wang et al. |
| 2014/0104124 A1 | 4/2014 | Chernokalov et al. |
| 2015/0296344 A1 | 10/2015 | Trojer et al. |
| 2015/0340765 A1 | 11/2015 | Dang et al. |
| 2016/0049723 A1 | 2/2016 | Baks et al. |
| 2016/0056946 A1 | 2/2016 | Moher |
| 2016/0204513 A1 | 7/2016 | Yemelong et al. |
| 2016/0359230 A1 | 12/2016 | Wang et al. |
| 2017/0324171 A1 | 11/2017 | Shehan |
| 2017/0353338 A1 | 12/2017 | Amadjikpe et al. |
| 2018/0027471 A1 | 1/2018 | Zhang et al. |
| 2018/0063139 A1 | 3/2018 | Day et al. |
| 2018/0191062 A1 | 7/2018 | Ndip et al. |
| 2018/0231651 A1 | 8/2018 | Charvat |
| 2018/0269576 A1 | 9/2018 | Scarborough et al. |
| 2018/0316090 A1 | 11/2018 | Foo |
| 2019/0020399 A1 | 1/2019 | Coutts |
| 2019/0020402 A1 | 1/2019 | Gharavi et al. |
| 2019/0020407 A1 | 1/2019 | Gharavi et al. |
| 2019/0089069 A1 | 3/2019 | Niroo et al. |
| 2019/0139914 A1 | 5/2019 | Kirino et al. |
| 2019/0230626 A1 | 7/2019 | Rune et al. |
| 2019/0297648 A1 | 9/2019 | Nagaraja et al. |
| 2019/0334253 A1 | 10/2019 | Corman et al. |
| 2020/0036414 A1 | 1/2020 | Shattil |
| 2020/0185299 A1 | 6/2020 | Chang et al. |
| 2020/0204249 A1 | 6/2020 | Pyun |
| 2020/0322016 A1 | 10/2020 | Kim et al. |
| 2020/0412519 A1 | 12/2020 | Krishnaswamy et al. |
| 2021/0058140 A1 | 2/2021 | Schwab et al. |
| 2021/0109145 A1 | 4/2021 | Haustein et al. |
| 2021/0203085 A1 | 7/2021 | Jordan et al. |

OTHER PUBLICATIONS

Corrected Notice of Allowance for U.S. Appl. No. 16/204,397 dated Jun. 7, 2021.
Corrected Notice of Allowance for U.S. Appl. No. 16/233,044 dated Jun. 11, 2021.
Corrected Notice of Allowance for U.S. Appl. No. 16/354,390 dated Apr. 9, 2021.
Corrected Notice of Allowance for U.S. Appl. No. 16/354,390 dated Jun. 3, 2021.
Corrected Notice of Allowance for U.S. Appl. No. 16/364,956 dated May 6, 2021.
Corrected Notice of Allowance for U.S. Appl. No. 16/388,043 dated Apr. 15, 2021.
Corrected Notice of Allowance for U.S. Appl. No. 16/689,758 dated Apr. 29, 2021.
Corrected Notice of Allowance for U.S. Appl. No. 16/689,758 dated Apr. 7, 2021.
Corrected Notice of Allowance for U.S. Appl. No. 16/689,758 dated May 27, 2021.
Corrected Notice of Allowance for U.S. Appl. No. 16/866,536 dated Apr. 29, 2021.
Corrected Notice of Allowance for U.S. Appl. No. 16/927,470 dated Apr. 26, 2021.

(56) References Cited

OTHER PUBLICATIONS

Final Office Action for U.S. Appl. No. 16/233,044 dated Apr. 19, 2021.
Final Office Action for U.S. Appl. No. 16/398,156 dated Apr. 19, 2021.
Non-Final Office Action for U.S. Appl. No. 17/011,042 dated Mar. 23, 2021.
Notice of Allowability for U.S. Appl. No. 16/819,388 dated Apr. 28, 2021.
Notice of Allowability for U.S. Appl. No. 16/819,388 dated Apr. 5, 2021.
Notice of Allowability for U.S. Appl. No. 16/819,388 dated May 27, 2021.
Notice of Allowance for U.S. Appl. No. 16/233,044 dated Jun. 4, 2021.
Notice of Allowance for U.S. Appl. No. 16/377,847 dated Apr. 5, 2021.
Notice of Allowance for U.S. Appl. No. 16/388,043 dated May 7, 2021.
Notice of Allowance for U.S. Appl. No. 16/451,980 dated Mar. 23, 2021.
Notice of Allowance for U.S. Appl. No. 16/941,690 dated May 5, 2021.
Supplemental Notice of Allowance for U.S. Appl. No. 16/451,980 dated May 18, 2021.
Supplemental Notice of Allowance for U.S. Appl. No. 16/451,998 dated May 18, 2021.
Supplemental Notice of Allowance for U.S. Appl. No. 16/452,023 dated Apr. 30, 2021.
Supplemental Notice of Allowance for U.S. Appl. No. 16/666,680 dated Jun. 10, 2021.
Supplemental Notice of Allowance for U.S. Appl. No. 16/866,536 dated Jun. 7, 2021.
Supplemental Notice of Allowance for U.S. Appl. No. 16/941,690 dated May 18, 2021.
Corrected Notice of Allowance for U.S. Appl. No. 16/920,191 dated Jun. 22, 2022.
Corrected Notice of Allowance for U.S. Appl. No. 16/920,191 dated May 10, 2022.
Corrected Notice of Allowance for U.S. Appl. No. 16/920,191 dated May 18, 2022.
Corrected Notice of Allowance for U.S. Appl. No. 16/935,422 dated Jun. 8, 2022.
Corrected Notice of Allowance for U.S. Appl. No. 16/935,515 dated Jun. 8, 2022.
Corrected Notice of Allowance for U.S. Appl. No. 17/091,520 dated Apr. 26, 2022.
Corrected Notice of Allowance for U.S. Appl. No. 17/171,521 dated Jul. 7, 2022.
Corrected Notice of Allowance for U.S. Appl. No. 17/171,521 dated Jul. 13, 2022.
Final Office Action for U.S. Appl. No. 16/927,225 dated Jun. 24, 2022.
Non-Final Office Action for U.S. Appl. No. 17/011,042 dated Jul. 1, 2022.
Non-Final Office Action for U.S. Appl. No. 17/243,747 dated Jun. 6, 2022.
Notice of Allowance for U.S. Appl. No. 16/935,515 dated Jun. 1, 2022.
Notice of Allowance for U.S. Appl. No. 17/004,373 dated May 23, 2022.
Notice of Allowance for U.S. Appl. No. 17/329,276 dated Jun. 28, 2022.
Notice of Allowance for U.S. Appl. No. 16/935,422 dated May 31, 2022.
Notice of Allowance for U.S. Appl. No. 17/060,182 dated Jun. 8, 2022.
Notice of Allowance for U.S. Appl. No. 17/337,529 dated May 4, 2022.
Corrected Notice of Allowance for U.S. Appl. No. 16/125,757 dated Jul. 16, 2021.
Corrected Notice of Allowance for U.S. Appl. No. 16/125,757 dated Jun. 28, 2021.
Corrected Notice of Allowance for U.S. Appl. No. 16/233,044 dated Sep. 10, 2021.
Corrected Notice of Allowance for U.S. Appl. No. 16/354,390 dated Jul. 13, 2021.
Corrected Notice of Allowance for U.S. Appl. No. 16/364,956 dated Jun. 23, 2021.
Corrected Notice of Allowance for U.S. Appl. No. 16/377,847 dated Aug. 20, 2021.
Corrected Notice of Allowance for U.S. Appl. No. 16/377,847 dated Jul. 13, 2021.
Corrected Notice of Allowance for U.S. Appl. No. 16/377,847 dated Jul. 6, 2021.
Corrected Notice of Allowance for U.S. Appl. No. 16/388,043 dated Aug. 27, 2021.
Corrected Notice of Allowance for U.S. Appl. No. 16/391,628 dated Jul. 30, 2021.
Corrected Notice of Allowance for U.S. Appl. No. 16/391,628 dated Jun. 29, 2021.
Corrected Notice of Allowance for U.S. Appl. No. 16/398,156 dated Aug. 13, 2021.
Corrected Notice of Allowance for U.S. Appl. No. 16/689,758 dated Jul. 6, 2021.
Final Office Action for U.S. Appl. No. 17/011,042 dated Jul. 2, 2021.
Non-Final Office Action for U.S. Appl. No. 17/091,520 dated Jul. 8, 2021.
Notice of Allowance for U.S. Appl. No. 16/398,156 dated Jul. 6, 2021.
Supplemental Notice of Allowance for U.S. Appl. No. 16/451,980 dated Aug. 6, 2021.
Supplemental Notice of Allowance for U.S. Appl. No. 16/451,980 dated Jun. 30, 2021.
Supplemental Notice of Allowance for U.S. Appl. No. 16/451,998 dated Jun. 24, 2021.
Supplemental Notice of Allowance for U.S. Appl. No. 16/666,680 dated Jul. 9, 2021.
Supplemental Notice of Allowance for U.S. Appl. No. 16/866,536 dated Jul. 21, 2021.
Supplemental Notice of Allowance for U.S. Appl. No. 16/941,690 dated Aug. 9, 2021.
Corrected Notice of Allowance for U.S. Appl. No. 16/920,191 dated Feb. 15, 2022.
Corrected Notice of Allowance for U.S. Appl. No. 17/091,520 dated Feb. 2, 2022.
Corrected Notice of Allowance for U.S. Appl. No. 17/091,520 dated Jan. 28, 2022.
Corrected Notice of Allowance for U.S. Appl. No. 17/091,520 dated Mar. 17, 2022.
Final Office Action for U.S. Appl. No. 17/011,042 dated Mar. 14, 2022.
Non-Final Office Action for U.S. Appl. No. 16/935,422 dated Jan. 21, 2022.
Non-Final Office Action for U.S. Appl. No. 16/935,515 dated Jan. 21, 2022.
Non-Final Office Action for U.S. Appl. No. 17/004,373 dated Feb. 15, 2022.
Non-Final Office Action for U.S. Appl. No. 17/060,182 dated Feb. 25, 2022.
Non-Final Office Action for U.S. Appl. No. 17/208,984 dated Apr. 12, 2022.
Non-Final Office Action for U.S. Appl. No. 17/230,566 dated Apr. 12, 2022.
Non-Final Office Action for U.S. Appl. No. 17/337,529 dated Jan. 26, 2022.
Notice of Allowance for U.S. Appl. No. 16/920,191 dated Feb. 2, 2022.
Notice of Allowance for U.S. Appl. No. 17/171,521 dated Apr. 6, 2022.

(56) References Cited

OTHER PUBLICATIONS

Corrected Notice of Allowance for U.S. Appl. No. 16/398,156 dated Nov. 17, 2021.
Corrected Notice of Allowance for U.S. Appl. No. 17/091,520 dated Dec. 14, 2021.
Non-Final Office Action for U.S. Appl. No. 16/920,191 dated Oct. 15, 2021.
Non-Final Office Action for U.S. Appl. No. 16/927,225 dated Dec. 22, 2021.
Non-Final Office Action for U.S. Appl. No. 17/011,042 dated Oct. 29, 2021.
Notice of Allowance for U.S. Appl. No. 17/091,520 dated Oct. 27, 2021.
Corrected Notice of Allowance for U.S. Appl. No. 16/935,422 dated Oct. 17, 2022.
Corrected Notice of Allowance for U.S. Appl. No. 16/935,422 dated Sep. 14, 2022.
Corrected Notice of Allowance for U.S. Appl. No. 16/935,515 dated Oct. 17, 2022.
Corrected Notice of Allowance for U.S. Appl. No. 16/935,515 dated Sep. 14, 2022.
Corrected Notice of Allowance for U.S. Appl. No. 17/171,521 dated Aug. 29, 2022.
Corrected Notice of Allowance for U.S. Appl. No. 17/329,276 dated Oct. 11, 2022.
Corrected Notice of Allowance for U.S. Appl. No. 17/337,529 dated Aug. 3, 2022.
Corrected Notice of Allowance for U.S. Appl. No. 17/337,529 dated Oct. 5, 2022.
Final Office Action for U.S. Appl. No. 17/011,042 dated Oct. 7, 2022.
Non-Final Office Action for U.S. Appl. No. 17/230,696 dated Oct. 6, 2022.
Non-Final Office Action for U.S. Appl. No. 17/377,983 dated Oct. 26, 2022.
Non-Final Office Action for U.S. Appl. No. 17/382,398 dated Oct. 19, 2022.
Non-Final Office Action for U.S. Appl. No. 17/408,606 dated Aug. 16, 2022.
Non-Final Office Action for U.S. Appl. No. 17/536,235 dated Oct. 11, 2022.
Non-Final Office Action for U.S. Appl. No. 17/742,648 dated Oct. 5, 2022.
Notice of Allowability for U.S. Appl. No. 17/337,529 dated Aug. 10, 2022.
Notice of Allowability for U.S. Appl. No. 17/004,373 dated Aug. 17, 2022.
Notice of Allowability for U.S. Appl. No. 17/004,373 dated Aug. 31, 2022.
Notice of Allowability for U.S. Appl. No. 17/004,373 dated Oct. 24, 2022.
Notice of Allowability for U.S. Appl. No. 17/060,182 dated Aug. 19, 2022.
Notice of Allowability for U.S. Appl. No. 17/060,182 dated Oct. 20, 2022.
Notice of Allowability for U.S. Appl. No. 17/060,182 dated Sep. 20, 2022.
Notice of Allowance for U.S. Appl. No. 16/927,225 dated Oct. 3, 2022.
Notice of Allowance for U.S. Appl. No. 17/208,984 dated Aug. 16, 2022.
Notice of Allowance for U.S. Appl. No. 17/230,566 dated Aug. 25, 2022.
Notice of Allowance for U.S. Appl. No. 17/243,747 dated Sep. 27, 2022.
Notice of Allowance for U.S. Appl. No. 17/365,037 dated Aug. 10, 2022.
Corrected Notice of Allowance for U.S. Appl. No. 16/927,225 dated Feb. 1, 2023.
Corrected Notice of Allowance for U.S. Appl. No. 16/927,225 dated Nov. 23, 2022.
Corrected Notice of Allowance for U.S. Appl. No. 17/329,276 dated Nov. 23, 2022.
Corrected Notice of Allowance for U.S. Appl. No. 17/337,529 dated Nov. 10, 2022.
Corrected Notice of Allowance for U.S. Appl. No. 17/365,037 dated Jan. 5, 2023.
Corrected Notice of Allowance for U.S. Appl. No. 17/365,037 dated Nov. 15, 2022.
Corrected Notice of Allowance for U.S. Appl. No. 17/365,037 dated Nov. 25, 2022.
Corrected Notice of Allowance for U.S. Appl. No. 17/742,648 dated Feb. 1, 2023.
Corrected Notice of Allowance for U.S. Appl. No. 17/208,984 dated Nov. 23, 2022.
Non-Final Office Action for U.S. Appl. No. 17/887,672 dated Dec. 6, 2022.
Non-Final Office Action for U.S. Appl. No. 17/396,063 dated Jan. 18, 2023.
Non-Final Office Action for U.S. Appl. No. 17/408,583 dated Nov. 4, 2022.
Notice of Allowability for U.S. Appl. No. 17/230,566 dated Feb. 2, 2023.
Notice of Allowability for U.S. Appl. No. 17/243,747 dated Dec. 2, 2022.
Notice of Allowability for U.S. Appl. No. 17/243,747 dated Jan. 5, 2023.
Notice of Allowance for U.S. Appl. No. 17/230,696 dated Jan. 20, 2023.
Notice of Allowance for U.S. Appl. No. 17/408,606 dated Feb. 1, 2023.
Notice of Allowance for U.S. Appl. No. 17/742,648 dated Jan. 25, 2023.
Notice of Allowance for U.S. Appl. No. 17/863,874 dated Nov. 18, 2022.
Notice of Allowance for U.S. Appl. No. 17/946,734 dated Jan. 30, 2023.
Supplemental Notice of Allowability for U.S. Appl. No. 17/208,984 dated Nov. 10, 2022.
Supplemental Notice of Allowance for U.S. Appl. No. 17/208,984 dated Jan. 5, 2023.
Supplemental Notice of Allowance for U.S. Appl. No. 17/230,566 dated Jan. 5, 2023.
Corrected Notice of Allowability for U.S. Appl. No. 17/382,398 dated Mar. 13, 2023.
Final Office Action for U.S. Appl. No. 17/377,983 dated Feb. 10, 2023.
Final Office Action for U.S. Appl. No. 17/887,672 dated Mar. 30, 2023.
Non-Final Office Action for U.S. Appl. No. 17/011,042 dated Feb. 3, 2023.
Non-Final Office Action for U.S. Appl. No. 17/898,706 dated Mar. 28, 2023.
Non-Final Office Action for U.S. Appl. No. 17/903,092 dated Feb. 16, 2023.
Non-Final Office Action for U.S. Appl. No. 17/903,130 dated Feb. 27, 2023.
Notice of Allowance for U.S. Appl. No. 17/208,893 dated Mar. 8, 2023.
Notice of Allowance for U.S. Appl. No. 17/377,983 dated Apr. 19, 2023.
Notice of Allowance for U.S. Appl. No. 17/382,398 dated Feb. 28, 2023.
Notice of Allowance for U.S. Appl. No. 17/408,583 dated Feb. 27, 2023.
Notice of Allowance for U.S. Appl. No. 17/536,235 dated Feb. 15, 2023.
Notice of Allowance for U.S. Appl. No. 17/978,565 dated Mar. 17, 2023.

ACTIVE REPEATER DEVICE SHARED BY MULTIPLE SERVICE PROVIDERS TO FACILITATE COMMUNICATION WITH CUSTOMER PREMISES EQUIPMENT

CROSS-REFERENCE TO RELATED APPLICATIONS/INCORPORATION BY REFERENCE

This Patent Application makes reference to, claims priority to, claims the benefit of, and is a Continuation Application of U.S. patent application Ser. No. 16/689,758, filed Nov. 20, 2019, which is a Continuation Application of U.S. application Ser. No. 16/032,668, now U.S. Pat. No. 10,630,373, filed Jul. 11, 2018, which claims priority to U.S. Provisional Patent Application Ser. No. 62/531,161 filed on Jul. 11, 2017.

The above referenced Application is hereby incorporated herein by reference in its entirety.

FIELD OF TECHNOLOGY

Certain embodiments of the disclosure relate to an active repeater device in a wireless system. More specifically, certain embodiments of the disclosure relate to an active repeater device that can be shared by multiple service providers to facilitate communication with multiple customer premises equipment (CPEs).

BACKGROUND

Wireless telecommunication in modern times has witnessed advent of various signal processing and transmission techniques and methods, such beam forming techniques, for enhancing capacity of radio channels. A conventional repeater device may be configured to relay one or more RF signals received from a particular base station (associated with a particular service provider) to one or more customer premises equipment (CPE) registered with the particular service provider. The conventional repeater device may only receive input RF signals from the particular base station. Hence, the conventional repeater devices may only serve the particular service provider and the one or more CPEs which may be registered with the particular service provider.

In certain scenarios, a plurality of service providers may operate in a particular geographical region. In such cases, each of the plurality of service providers may require different repeater devices to operate in the particular geographical region. Installation and maintenance costs of each of the plurality of repeater devices may be exclusively borne by a corresponding service provider which may be served by the respective repeater device. Hence, use of conventional RF repeater devices in such scenarios may not be economical. Thus, an advanced active repeater device may be desired that may efficiently share its resources between multiple service providers and multiple CPEs without affecting quality level of bidirectional communication to- and from the CPEs.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

An active repeater device shareable by multiple service providers to facilitate communication with multiple customer premises equipment (CPEs) is provided and, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Figure 1A:
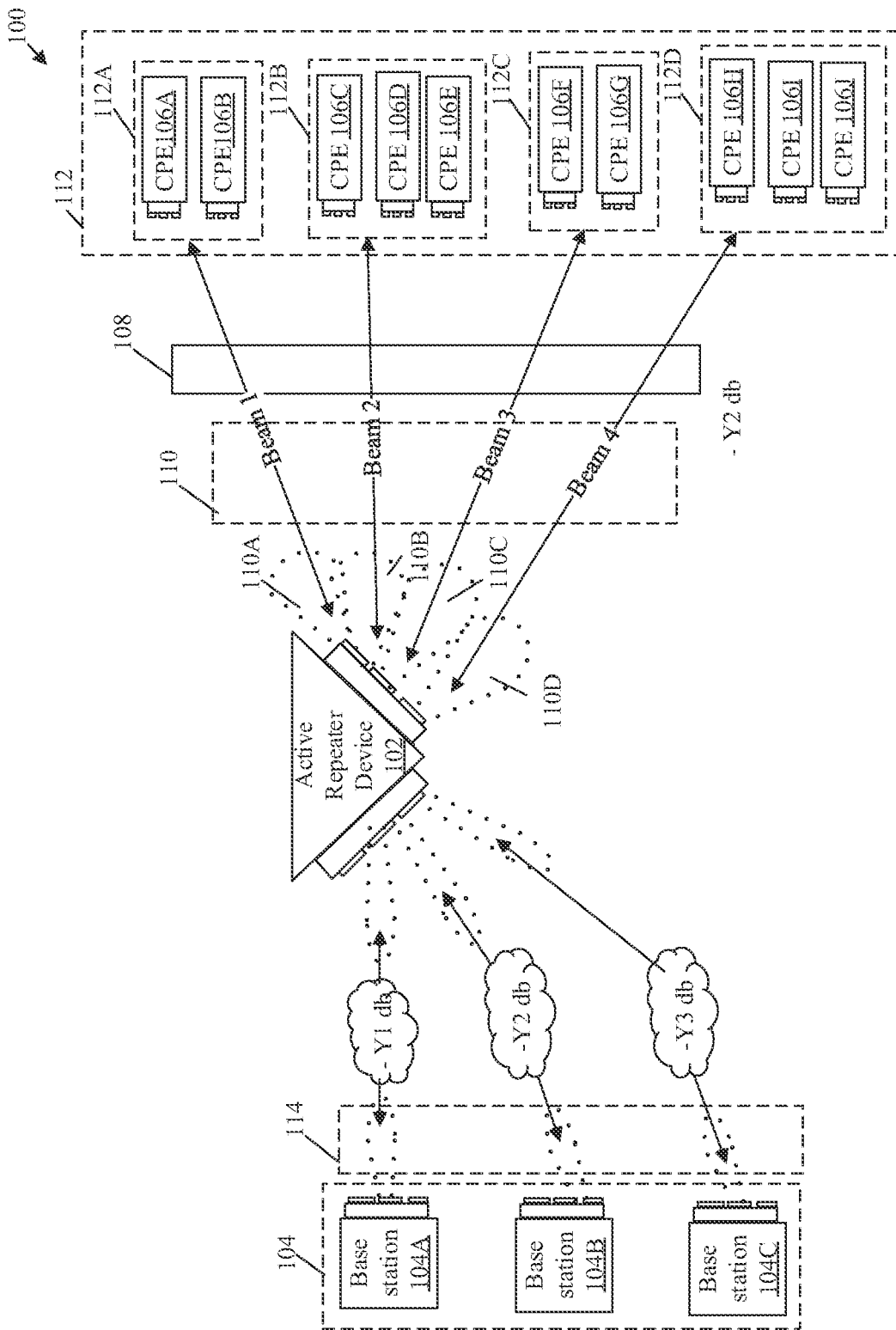
FIG. 1A is a network environment diagram that illustrates an exemplary active repeater device shareable by multiple service providers, in accordance with an exemplary embodiment of the disclosure.

Certain embodiments of the disclosure may be found in an active repeater device for beam widening to communicate with a plurality of customer premises equipment. Emergence of 5G networks in cm-wave and mm-wave bands is introducing new opportunities as well as new technical challenges. 5G networks may provide orders of magnitude improvement in throughput and capacity complimented by the availability of wider spectrum bands, for example, in 28/39/60 GHz frequencies (or between 28-300 GHz) and massive frequency reuse through utilization of highly directional antennas. However, deployment of 5G networks is conditioned on overcoming challenges for example:

1. Higher propagation loss at high frequencies with a single antenna of size $\sim\lambda/2$. This is a well understood challenge with a well-analyzed solution, where use of steerable phased arrays may overcome this challenge by building large antenna apertures through co-phasing of many small antenna elements.
2. Need for trackable line-of-sight (LOS) path or strong reflective path between transmitter and receiver. Lack of refraction and diffraction in high radio frequencies also limits availability of links to LOS path or strong mirror-like reflective paths. This may be a constraint to deliver wireless connections that are to be made available anywhere and anytime.
3. High transmittance loss through the signal-obstructing physical objects or material at high radio frequencies. The high radio frequencies, such as the cm-wave and mm-wave radio signals, demonstrate high transmittance losses when propagating through typical signal-obstructing physical objects or materials, such as tinted glass, wood, drywall, other glasses etc, when compared to sub-5 GHz radio signals. This may be a constraint to availability of connections, anywhere and anytime.

The first challenge is well understood and successfully mitigated by use of large phased array antennas. However, currently, there are no widely-agreed-on and/or standard mitigation techniques to the second and the third challenges as given above. The disclosed active repeater device not only mitigates at least the two remaining challenges, but also enables efficient sharing of its beamforming resources with multiple service providers without affecting quality level of bidirectional communication between different base stations and customer premises equipment (CPEs), or other active repeater devices. The disclosed active repeater device may serve a plurality of service providers as opposed to a conventional active repeater device which may only serve a single service provider. Hence, use of the active repeater device may be more cost efficient in comparison with use of the conventional active repeater device. In some embodiments, the disclosed active repeater device has an ability to group a plurality of CPEs into different groups, which significantly increases its transmission range by concurrent multi-beam transmission with the different groups of CPEs. In the following description, reference is made to the accompanying drawings, which form a part hereof, and in which is shown, by way of illustration, various embodiments of the present disclosure.

FIG. 1A is a network environment diagram that illustrates an exemplary active repeater device in communication with a plurality of base stations and a plurality of customer premises equipment, in accordance with an exemplary embodiment of the disclosure. With reference to FIG. 1A, there is shown a network environment 100 that may include an active repeater device 102, a plurality of base stations 104 and a plurality of customer premises equipment (CPEs) 106A to 106J. The plurality of base stations 104 may be located at a certain distance from each CPE of the plurality of CPEs 106A to 106J. The plurality of base stations 104 may comprise a first base station 104A, a second base station 104B, and a third base station 104C. The plurality of base station 104 may be associated with a plurality of different service providers.

The active repeater device 102 may be installed at a defined location and may be stationary. There is also shown a signal-obstructing physical object 108 that may partially block or impair a plurality of beams 110 (such as a first beam 110A, a second beam 110B, a third beam 110C, and a fourth beam 110D) of output RF signals communicated between the active repeater device 102 and the plurality of CPEs 106A to 106J.

The plurality of CPEs 106A to 106J may be grouped into a plurality of groups of CPEs 112 (such as a first group of CPEs 112A, a second group of CPEs 112B, a third group of CPEs 112C, and a fourth group of CPEs 112D). The plurality of base stations 104 may be configured to transmit a plurality of beams 114 of input RF signals to the active repeater device 102. In certain scenarios, the active repeater device 102 may be positioned in a vicinity of a signal obstructing object, such as a tall building which may partially block the path of the plurality of beams 114 of input RF signals. The active repeater device 102 may be realized by various components, such as transmitter front-ends, receiver front-ends, a plurality of low-noise amplifiers, a plurality of phase shifters, a plurality of power combiners, a plurality of power dividers, and a plurality of power amplifiers, logical control units, controllers and mixers.

Each of the plurality of base stations 104, for example, an Evolved Node B (eNB) or gNB, may be a fixed point of communication that may relay information, in form of the plurality of beams 110 of RF signals, to and from communication devices, such as the active repeater device 102 and the plurality of CPEs 106A to 106J. Multiple base stations corresponding to multiple service providers, may be geographically positioned to cover specific geographical areas. Typically, bandwidth requirements serve as a guideline for a location of the plurality of base stations 104 based on relative distance between the plurality of base stations 104 and the plurality of CPEs 106A to 106J. The count of base stations may be dependent on population density and geographic irregularities, such as buildings and mountain ranges, which may interfere with the plurality of beams 110 of output RF signals.

Each of the plurality of base stations 104 may be configured to transmit the plurality of beams 114 of input RF signals to the active repeater device 102. In one example, each of the plurality of beams 114 of input RF signals may have a first beam pattern, such as a narrow beam, may be received by the active repeater device 102. Each of the plurality of base stations 104 may be configured to generate the narrow beams of the input RF signals to achieve a high transmission range so that the narrow beam of the input RF signals reaches the known location of the active repeater device 102. Since the active repeater device 102 may be stationary at the defined location, each of the plurality of base stations 104 may not need to track location of the active repeater device 102 periodically or constantly.

Each of the plurality of CPEs 106A to 106J may correspond to a telecommunication hardware that may be used by an end-user to communicate. Alternatively stated, each of the plurality of CPEs 106A to 106J may refer to a combination of mobile equipment and subscriber identity module (SIM). Each of the plurality of CPEs 106A to 106J may be configured to communicate with the active repeater device 102 by use of RF signals. Examples of the plurality of CPEs 106A to 106J may include, but are not limited to a wireless modem, a home router, a cable or satellite television set-top box, a VoIP base station, or any other customized hardware for telecommunication. The active repeater device 102 may be deployed between the plurality of base stations 104 (e.g. an eNB) and the plurality of CPEs 106A to 106J to mitigate lack of line-of-sight (LOS) between the plurality of base stations 104 and the plurality of CPEs 106A to 106J.

In operation, the active repeater device 102 may be configured to receive the plurality of beams 114 of input RF signals having a first beam pattern. The plurality of beams 114 of input RF signals may be received by the active repeater device 102 from the plurality of base stations 104. Each of the plurality of beams 114 of input RF signals may correspond to a narrow beam such as a pencil beam which may cover a first geographical area. Since the active repeater device 102 and the plurality of base stations 104 may be stationary, each of the plurality of base stations 104 may be configured to direct the narrow beam to the active repeater device 102 at the known location of the active repeater device 102.

The plurality of base stations 104 may be associated with a plurality of different service providers. The active repeater device 102 may be configured to serve the plurality of different service providers. Therefore, cost of implementation of the active repeater device 102 may be borne collectively by the plurality of different service providers. A conventional active repeater device may only serve a single service provider. Cost of installation of the conventional active repeater device may be borne by the single service provider which may be served by the conventional active repeater device. Hence, use of the active repeater device 102 may be more cost efficient in comparison with use of the conventional active repeater device.

The active repeater device 102 may be configured to receive the plurality of beams 114 of input RF signals via a first antenna array comprising a first set of antenna elements. In certain scenarios, the active repeater device 102 may be configured to receive the plurality of beams 114 of input RF signals from another active repeater device which may be a part of a non-line-of-sight (NLOS) transmission path. The NLOS transmission path may be between each of the plurality of base stations 104 and the plurality of CPEs 106A to 106J. The active repeater device 102 exhibits a demodulator-less architecture to avoid introduction of latency through the active repeater device 102. As a result of the demodulator-less architecture, the plurality of beams 110 of output RF signals may be transmitted by one or more antenna arrays of the active repeater device 102 to the plurality of CPEs 106A to 106J without demodulation of the data portion of the received plurality of beams 114 of input RF signals to minimize the latency for transmission of the plurality of beams 110 of output RF signals while maintaining a final error vector magnitude (EVM) target at end destination point (i.e. the plurality of CPEs 106A to 106J).

The active repeater device 102 may comprise a digital modem circuitry, for example, an embedded 5G modem. The digital modem circuitry may utilize the received plurality of beams 114 of input RF signals for control and monitoring operations, such as configuring and monitoring beamforming functions. Conventional active repeaters are simply digital signal amplifiers, which may decode both the header portion and the data portion for amplification, which adds to latency in communication. However, the active repeater device 102 does not process (i.e., demodulate) data stream in the received signal intended for end destination (i.e. the plurality of CPEs 106A to 106J). The data stream may also be referred to as the data portion of the received first beam of input RF signals. Only the header portion of the received signal may be decoded by the active repeater device 102 to extract control information.

The data stream may also be referred to as the data portion of the received plurality of beams 114 of input RF signals. For example, some subcarriers in the waveform of a received signal (i.e. the received plurality of beams 114 of input RF signals) may be dedicated for active repeater device 102 internal consumption, while the rest of subcarriers are assigned to other end users (i.e. the plurality of CPEs 106A to 106J). In this case, the digital modem circuitry selectively decodes only the subcarriers assigned for the consumption of the active repeater device 102 and the full received RF signal is still relayed towards the destination without demodulation of full waveform to achieve near-zero-latency while maintaining a final error vector magnitude (EVM) target at end destination point (i.e. the plurality of CPEs 106A to 106J) without relying on demodulation or re-modulation at an intermediate point, such as the deployment location of the active repeater device 102, for boosting EVM. Although this sets a higher limit on signal-to-noise ratio (SNR) quality for signal propagation through the active repeater device 102, the active repeater device 102 still achieves target final RX SNR (i.e. signal quality at the plurality of CPEs 106A to 106J is greater than a defined threshold SNR, for example, ~22 dB) as a result of the modular architecture of the active repeater device 102. Further, a conventional baseband unit (BBU) is voluminous, and is typically placed in an equipment room in mobile telecommunications systems and connected with remote radio head unit (RRU), via optical fiber. In contrast, a baseband signal processor of the primary sector of the active repeater device 102 may be implemented as the baseband signal processor card or chip, which is smaller in size and consumes less power in comparison with the conventional BBU. Thus, the baseband signal processor of the primary sector may also be referred to as a light baseband unit (LBU) or a simplified baseband unit (BBU) that may be smaller in size as compared to a conventional BBU.

The plurality of beams 114 of input RF signals may include one or more full-bandwidth signals intended for the plurality of CPEs 106A to 106J. For example, the plurality of beams 114 of input RF signals may comprise input RF signals intended for each of the plurality of CPEs 106A to 106J. The plurality of beams 114 of the input RF signals may further comprise a different input RF signals intended for different corresponding CPEs of the plurality of CPEs 106A to 106J. For example, the plurality of beams 114 of the input RF signals may comprise a first input RF signal intended for the first CPE 106A.

In accordance with an embodiment, the active repeater device 102 may be configured to receive a plurality of RF signals from each of the plurality of CPEs 106A to 106J. The active repeater device 102 may be configured to measure Received Signal Strength Indicator (RSSI) associated with each of the plurality of RF signals received from the plurality of CPEs 106A to 106J. The active repeater device 102 may be configured to estimate a location of each of the plurality of CPEs 106A to 106J with respect to the active repeater device 102.

In accordance with an embodiment, the active repeater device 102 may be configured to estimate a distance of each of the plurality of CPEs 106A to 106J based on the measured RSSI. The active repeater device 102 may not be required to constantly or too frequently, (such as less than a specified time period) to measure the RSSI associated with each of the plurality of RF signals received from the plurality of CPEs 106A to 106J. The measured RSSI associated with the plurality of CPEs 106A to 106J, in combination with the location or a distance of each of the plurality of CPEs 106A to 106J may be also referred to as one or more signal parameters associated with the plurality of CPEs 106A to 106J.

In accordance with an embodiment, the active repeater device 102 may be configured to classify the plurality of CPEs 106A to 106J into the plurality of groups of CPEs 112 based on the one or more signal parameters. The active repeater device 102 may be configured to classify the plurality of CPEs 106A to 106J into the plurality of groups of CPEs 112 based on location or distance of the plurality of CPEs 106A to 106J. In cases where locations of a first number of CPEs of the plurality of CPEs 106A to 106J, are within vicinity of each other, the active repeater device 102 may be configured to classify and group the first number of CPEs together. For example, the active repeater device 102 may be configured to classify the first CPE 106A and the second CPE 106B into the first group of CPEs 112A of the plurality of groups of CPEs 112. The active repeater device 102 may be configured to classify the third CPE 106C, the fourth CPE 106D, and the fifth CPE 106E together into the second group of CPEs 112B. The active repeater device 102 may be configured to classify the sixth CPE 106F and the seventh CPE 106G into the third group of CPEs 112C of the plurality of groups of CPEs 112. The active repeater device 102 may be configured to classify the eighth CPE 106H, the ninth CPE 106I and the tenth CPE 106J as the fourth group of CPEs 112D of the plurality of groups of CPEs 112. The measured RSSI associated with the plurality of CPEs 106A to 106J, in combination with the location or a distance of each of the plurality of CPEs 106A to 106J may also be referred to as the one or more signal parameters associated with the plurality of groups of CPEs 112.

In accordance with an embodiment, the active repeater device 102 may be configured to store a database comprising a plurality of beam settings. Each of the plurality of beam settings may correspond to a different beam profile of the plurality of beams 110 of output RF signals which may be generated by a second antenna array of a second RH unit of the active repeater device 102. Each of the plurality of beam settings comprises a set of beamforming coefficients. The active repeater device 102 may be configured to assign a different beam setting from the plurality of beam settings to each of the plurality of groups of CPEs 112. The active repeater device 102 may be configured to assign the different beam setting based on the one or more signal parameters associated with the plurality of groups of CPEs 112. The active repeater device 102 may be configured to assign a first set of beam settings (comprising a first beam setting, a second beam setting, a third beam setting, and a fourth beam setting) of the plurality of beam settings to the plurality of groups of CPEs 112.

In accordance with an embodiment, the active repeater device 102 may be configured to generate output RF signals based on the plurality of beams 114 of input RF signals. Further, the active repeater device 102 may be configured to generate the plurality of beams 110 of output RF signals, based on the assignment of the first set of beam settings to the plurality of groups of CPEs 112. The generated plurality of beams 110 of output RF signals may comprise a first beam 110A of output RF signals, a second beam 110B of output RF signals, a third beam 110C of output RF signals, and a fourth beam 110D of output RF signals. The first beam 110A, the second beam 110B, the third beam 110C and the fourth beam 110D of output RF signals may be generated based on the first beam setting, the second beam setting, the third beam setting and the fourth beam setting respectively. One or more second antenna arrays of the plurality of second antenna arrays may be configured to concurrently transmit the plurality of beams 110 of output RF signals to the plurality of groups of CPEs 112. The one or more second antenna arrays may be configured to concurrently transmit the plurality of beams 110 of output RF signals based on the assigned different beam settings to each group of the plurality of groups of CPEs 112.

In other embodiments, the active repeater device 102 may be configured to transmit the plurality of beams 110 of output RF signals during a plurality of available timeslots of a particular transmission time period. The active repeater device 102 may be configured to assign a different set of beam settings (such as the first set of beam settings) to the plurality of groups of CPEs 112 for each of the plurality of available timeslots. The active repeater device 102 may be configured to transmit the plurality of beams 110 of output RF signals based on the assignment of the different sets of beam settings to the plurality of groups of CPEs 112 for the plurality of available timeslots. For example, at a first timeslot "Ts1" of the plurality of available timeslots, the one or more second antenna arrays may be configured to transmit the plurality of beams 110 of output signals based on the first set of beam settings. Similarly, the one or more second antenna arrays may be configured to transmit the plurality of beams 110 of output signals at a second timeslot "Ts2", a third timeslot "Ts3", a fourth timeslot "Ts4", and a fifth timeslot "Ts5", based on a second set of beam settings, a third set of beam settings, a fourth set of beam settings, and a fifth set of beam settings respectively.

Each beam of the plurality of beams 110 of output RF signals may be transmitted exclusively to a corresponding group of the plurality of groups of CPEs 112. For example, the active repeater device 102 may be configured to transmit the first beam 110A to the first group of CPEs 112A. Similarly, the active repeater device 102 may be configured to transmit the second beam 110B, the third beam 110C, and the fourth beam 110D to the second group of CPEs 112B, the third group of CPEs 112C and the fourth group of CPEs 112D respectively. Unlike the active repeater device 102, a conventional active repeater may transmit a single wide beam to communicate with the plurality of CPEs 106A to 106J. However, the single wide beam used by the conventional active repeater device may be wider in comparison with each of the plurality of beams 110 of output RF signals transmitted to the plurality of groups of CPEs 112. A person with ordinary skill in art may understand that wide beams of RF signals have lesser transmission range than narrow beams of RF signals. Hence, each of the plurality of beams 110 of output RF signals may have a transmission range which may be larger in comparison with transmission range of the single wide beam transmitted by the conventional active repeater device. Hence, the active repeater device 102 may have larger transmission range in comparison to the conventional active repeater device.

In accordance with an embodiment, each beam of the plurality of beams 110 of output RF signals may be transmitted exclusively to a corresponding group of the plurality of groups of CPEs 112 based on an association of a corresponding group CPEs with a service provider.

In accordance with one embodiment, the active repeater device 102 may comprise a cascading receiver chain comprising a first set of power dividers, a first set of phase shifters, a first set of low noise amplifiers, and the first antenna array. The active repeater device 102 may comprise a cascading transmitter chain comprising a first set of power combiners, a second set of phase shifters, a first set of power amplifiers, and the second antenna array. The first antenna array may comprise a first set of antenna elements. The second antenna array may comprise a second set of antenna elements. The active repeater device 102 may be configured to partition the second set of antenna elements of the second antenna array into a plurality of spatially separated antenna sub-arrays.

In accordance with an embodiment, the second antenna array may be configured to generate a first set of beams of output RF signals based on the partition. Each of the plurality of spatially separated antenna sub-arrays may generate one or more beams of the first set of beams. Further, each beam of the plurality of beams 110 may be generated by super-position of the first set of beams of output RF signals with each other. In accordance with an embodiment, a multiple-input multiple-output (MIMO) based communication may be established between the plurality of base stations 104 and the plurality of CPEs 106A to 106J by the active repeater device 102. The active repeater device 102 may establish the MIMO communication in a non-line-of-sight (NLOS) transmission path based on the receipt of the plurality of beams 114 of input RF signals having the first beam pattern from the plurality of base stations 104. Further, the active repeater device 102 may be configured to establish the MIMO communication based on transmission of the plurality of beams 110 of output RF signals to the plurality of groups of CPEs 112.

Figure 1B:
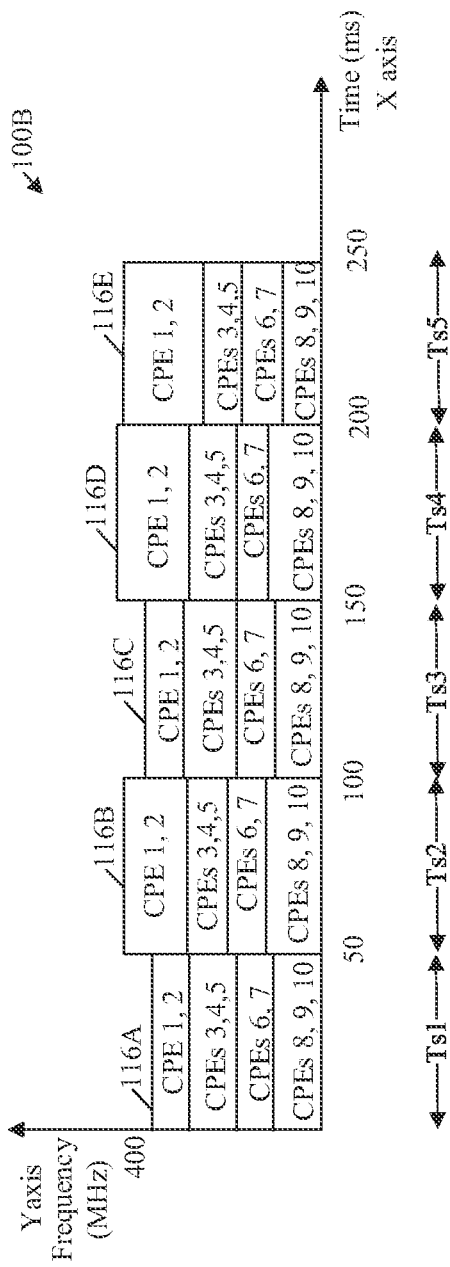
FIG. 1B is a first graph that illustrates a timing profile of resource block utilization of an exemplary active repeater device to facilitate communication with different CPEs, in accordance with an exemplary embodiment of the disclosure.

FIG. 1B is a graph that illustrates a timing profile of resource block utilization of an exemplary active repeater device to facilitate communication with multiple CPEs, in accordance with an exemplary embodiment of the disclosure. With reference to FIG. 1B, there is shown a graph 100B which depicts resource block allocation to each group of the plurality of groups of CPEs 112 in frequency domain, with respect to the plurality of timeslots (such as the first timeslot "Ts1", the second timeslot "Ts2", the third timeslot "Ts3", the fourth timeslot "Ts4" and the fifth timeslot "Ts5") in the transmission time period, as discussed in FIG. 1. A progress of time may be represented by the "X" axis of the first graph 100B, as shown. Frequency spectrum corresponding to a plurality of resource blocks allocated to each of the plurality of groups of CPEs 112 at different timeslots (such as the first timeslot "Ts1", the second timeslot "Ts2", the third timeslot "Ts3", the fourth timeslot "Ts4" and the fifth timeslot "Ts5") may be represented by the "Y" axis of the first graph 100B.

The active repeater device 102 may be configured to allocate one or more of a first set of resource blocks to the plurality of groups of CPEs 112, at the first timeslot "Ts1" (frequency spectrum allocated to the plurality of groups of CPEs 112 as the first set of resource blocks is represented as graph component 116A). The active repeater device 102 may be configured to allocate one or more of a second set of resource blocks to the plurality of groups of CPEs 112, at the second timeslot "Ts2" (frequency spectrum allocated to the plurality of groups of CPEs 106 as the second set of resource blocks is represented as graph component 116B). The active repeater device 102 may be configured to allocate one or more of a third set of resource blocks to the plurality of groups of CPEs 112, at the third timeslot "Ts3" (frequency spectrum allocated to the plurality of groups of CPEs 112 as the third set of resource blocks is represented as graph component 116C). The active repeater device 102 may be configured to allocate one or more of a fourth set of resource blocks to the plurality of groups of CPEs 112, at the fourth timeslot "Ts1" (frequency spectrum allocated to the plurality of groups of CPEs 112 as the fourth set of resource blocks is represented as graph component 116D). The active repeater device 102 may be configured to allocate one or more of a fifth set of resource blocks to the plurality of groups of CPEs 112, at the fifth timeslot "Ts5" (frequency spectrum allocated to the plurality of groups of CPEs 112 as the fifth set of resource blocks is represented as graph component 116E).

Figure 1C:
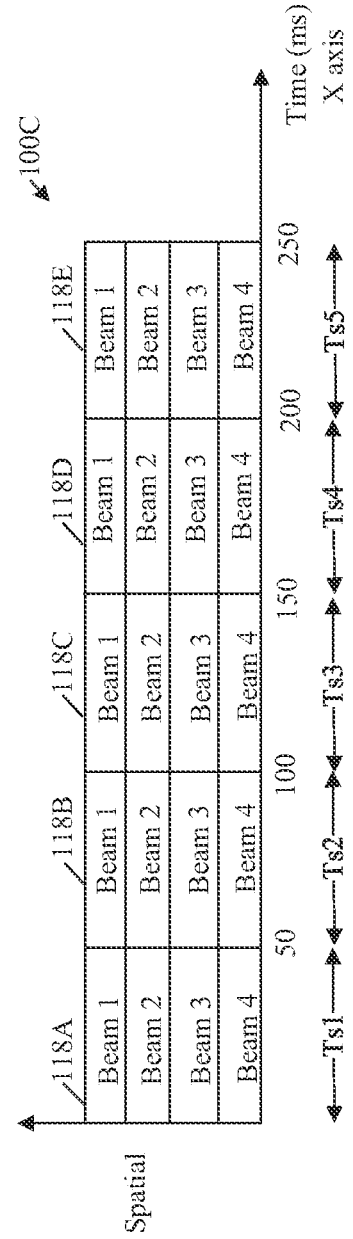
FIG. 1C is a second graph that illustrates a timing profile of beams of an exemplary active repeater device to facilitate communication with CPEs, in accordance with an exemplary embodiment of the disclosure.

FIG. 1C is a second graph that illustrates a timing profile of beams of an exemplary active repeater device, in accordance with an exemplary embodiment of the disclosure. With reference to FIG. 1C, there is shown a graph 100C which depicts beam allocation to each group of the plurality of groups of CPEs 112, with respect to the plurality of timeslots (such as the first timeslot "Ts1", the second timeslot "Ts2", the third timeslot "Ts3", the fourth timeslot "Ts4" and the fifth timeslot "Ts5") in the transmission time period as discussed in FIG. 1A.

Time may be represented by the "X" axis of the second graph 100C, as shown. Beams allocated to each of the plurality of groups of CPEs 112 may be represented by the "Y" axis of the graph 100C. In accordance with an embodiment, the active repeater device 102 may be configured to transmit the plurality of beams 110 of output RF signals to the plurality of groups of CPEs 112 based on the first set of beam settings during the first timeslot "Ts1" (as represented by graph component 118A). Similarly, the active repeater device 102 may be configured to transmit the plurality of beams 110 of output RF signals to the plurality of groups of CPEs 112 based on the second set of beam settings during the second timeslot "Ts2" (as represented by graph component 118B). The active repeater device 102 may be configured to transmit the plurality of beams 110 of output RF signals to the plurality of groups of CPEs 112 based on the third set of beam settings during the third timeslot "Ts3" (as represented by graph component 118C). The active repeater device 102 may be configured to transmit the plurality of beams 110 of output RF signals to the plurality of groups of CPEs 112 based on the fourth set of beam settings during the fourth timeslot "Ts4" (as represented by graph component 118D). The active repeater device 102 may be configured to transmit the plurality of beams 110 of output RF signals to the plurality of groups of CPEs 112 based on the fifth set of beam settings during the fifth timeslot "Ts5" (as represented by graph component 118E).

Figure 2A:
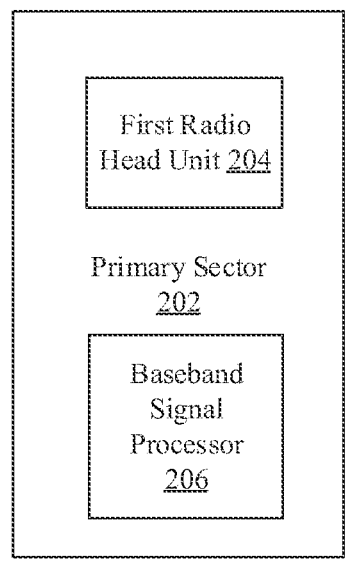
FIG. 2A is a block diagram illustrating an exemplary one-sector active repeater device, in accordance with an exemplary embodiment of the disclosure.

FIG. 2A is a block diagram illustrating an exemplary one-sector active repeater device, in accordance with an exemplary embodiment of the disclosure. FIG. 2A is explained in conjunction with elements from FIGS. 1A, 1B, and 1C. With reference to FIG. 2A, there is shown a one-sector active repeater device that includes a primary sector 202 of the active repeater device 102. The primary sector 202 of the active repeater device 102 comprises a first radio head (RH) unit 204 and a baseband signal processor 206.

In some embodiments, the first RH unit 204 may be implemented in the active repeater device 102 as a radio head (RH) card. Similarly, the baseband signal processor 206 may be implemented in the active repeater device 102 as a baseband signal processor card. Other examples of implementations of the RH card and the baseband signal processor card may include, but is not limited to an integrated circuit using a single or separate printed circuit boards (PCBs) as substrates, a radio frequency integrated chip (RFIC) and a system on a chip (SoC) device. The first RH unit 204 and the baseband signal processor 206 may be housed within the primary sector 202 of the active repeater device 102. The first RH unit 204 and the baseband signal processor 206 may be communicatively coupled with each other via a wired or wireless communication medium. The first RH unit 204 and the baseband signal processor 206 may communicate control signals and analog baseband signals with each other.

The baseband signal processor 206 of the primary sector 202 of the active repeater device 102 does not process (i.e., demodulate) data stream in the received signal intended for end destination (i.e. the plurality of CPEs 106A to 106J). The data stream may also be referred to as the data portion of the received plurality of beams 114 of input RF signals. The baseband signal processor 206 may decode only the header portion of the received plurality of beams 114 to extract control information. Conventional active repeaters are simply digital signal amplifiers, which may decode both the header portion and the data portion for amplification, which adds to latency in communication. Further, a conventional baseband unit (BBU) is voluminous, and is typically placed in an equipment room in mobile telecommunications systems and connected with remote radio head unit (RRU), via optical fiber.

In contrast, the baseband signal processor 206 of the primary sector 202 of the active repeater device 102 may be implemented as the baseband signal processor card or chip, which is smaller in size and consumes less power in comparison with the conventional BBU. Thus, the baseband signal processor 206 may also be referred to as a light baseband unit (LBU) or a simplified baseband unit (BBU) that may be smaller in size as compared to a conventional BBU. The baseband signal processor 206 may thus be housed in the primary sector 202 of the active repeater device 102, as shown.

The active repeater device 102 has a modular architecture that includes the primary sector 202, which includes the baseband signal processor 206 and the first RH unit 204. A first antenna array in the first RH unit 204 may be configured to receive a first beam of input RF signals. Thereafter, the first RH unit 204 may be configured to generate a first set of analog baseband signals based on the received first beam of input RF signals. The baseband signal processor 206 may be configured to convert the first set of analog baseband signals received from the first RH unit 204 to a first set of coded data signals.

A digital modem circuitry in the baseband signal processor may be configured to extract control information from the first set of coded data signals by decoding only the header portion of the first set of coded data signals without demodulation of data portion of the first set of coded data signals. Further, the active repeater device 102 may include one or more secondary sectors (such as secondary sectors 208 and 212). Each of the one or more secondary sectors may be communicatively coupled to the primary sector 202 and includes a second RH unit (such as the RH unit 210 and 214).

The second RH unit may be configured to transmit the first set of coded data signals as one or more beams of output RF signals by one or more second antenna arrays of the one or more secondary sectors to the plurality of CPEs 106A to 106J), based on the extracted control information from the first set of coded data signals. The one or more beams of output RF signals may be transmitted without demodulation of the data portion of the first set of coded data signals within the active repeater device 102 to reduce latency for transmission of the first set of coded data signals. Thus, the baseband signal processor 206 of the primary sector 202 of the active repeater device 102 does not process (i.e., demodulate) data stream in the received signal intended for end destination (i.e. the plurality of CPEs 106A to 106J) to reduce latency in communication to the end destination without compromise in signal quality. For example, a target final Rx SNR may be achieved (i.e. signal quality at the plurality of CPEs 106A to 106J may be greater than a defined threshold SNR, for example, ~22 dB).

Figure 2B:
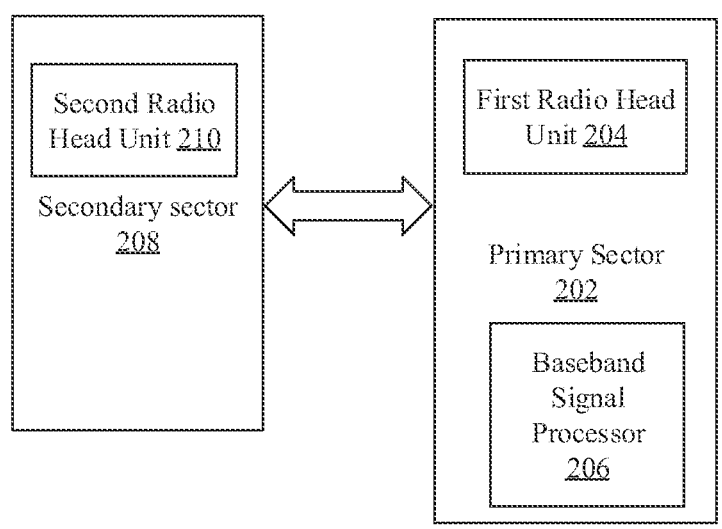
FIG. 2B is a block diagram illustrating an exemplary two-sector active repeater device, in accordance with an exemplary embodiment of the disclosure.

FIG. 2B is a block diagram illustrating an exemplary two-sector active repeater device, in accordance with an exemplary embodiment of the disclosure. FIG. 2B is explained in conjunction with elements from FIGS. 1A, 1B, 1C, and 2A. With reference to FIG. 2B, there is shown a two-sector active repeater device that includes the primary sector 202 of the active repeater device 102 (of FIG. 2A) and a secondary sector 208. The secondary sector 208 may include a second RH unit 210. The second RH unit 210 may be similar to the first RH unit 204. The secondary sector 208 may be communicatively coupled with the primary sector 202 via one or more signal cables (e.g. a control signal cable and two baseband (IQ) signal cables).

Figure 2C:
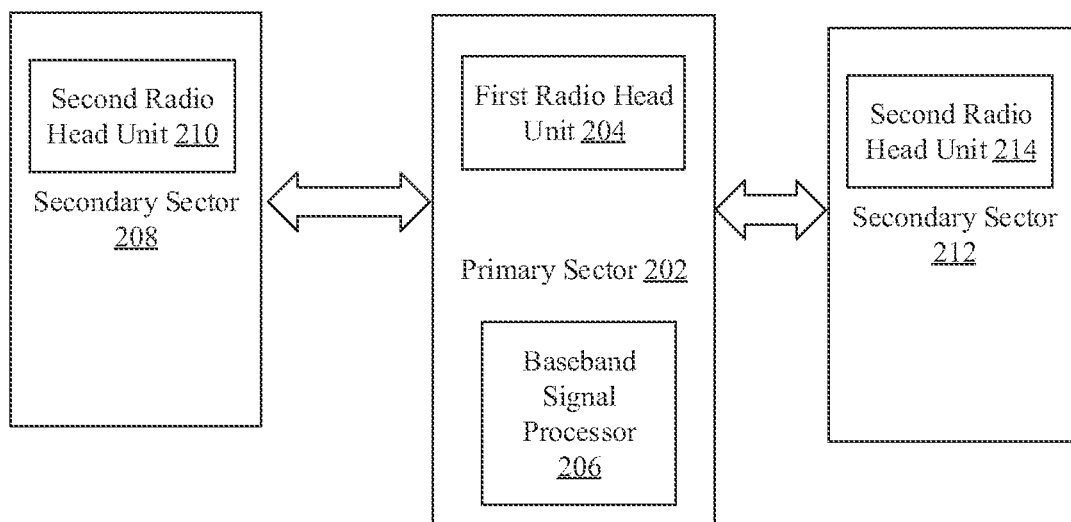
FIG. 2C is a block diagram illustrating an exemplary three-sector active repeater device, in accordance with an exemplary embodiment of the disclosure.

FIG. 2C is a block diagram illustrating an exemplary three-sector active repeater device, in accordance with an exemplary embodiment of the disclosure. FIG. 2C is explained in conjunction with elements from FIGS. 1, 2A, and 2B. With reference to FIG. 2C, there is shown a three-sector active repeater device that includes an additional secondary sector, such as a secondary sector 212, connected to the two-sector active repeater device of FIG. 2B. The secondary sector 212 may include a second RH unit 214 similar to the second RH unit 210. The secondary sector 212 may be communicatively coupled to the primary sector 202 via the one or more signal cables. As a result of this modular architecture, the active repeater device 102 may be upgradable or re-configurable to at least one of a base station (gNB), a small cell access point, or a remote radio head (RRH). The active repeater device 102 may be upgraded by replacing the baseband signal processor 206 with a suitable baseband unit (BBU) known in the art. The baseband signal processor 206 of the primary sector 202 may be configured to support multi-band millimeter wave (mm Wave) spectrum and sub-30 GHz spectrum concomitantly.

The baseband signal processor 206 of the primary sector 202 of the active repeater device 102 does not process (i.e., demodulate) data stream in the received signal intended for end destination (i.e. the plurality of CPEs 106A to 106J). The data stream may also be referred to as the data portion of the received first beam of input RF signals. The baseband signal processor 206 may decode the header portion of the received signal to extract control information. The baseband signal processor 206 may decode the header portion of the received signal to further extract scheduling information associated with a TDMA wireless signal transmission scheme.

Conventional active repeaters are simply digital signal amplifiers, which may decode both the header portion and the data portion for amplification, which adds to latency in communication. Further, a conventional baseband unit (BBU), is typically placed in an equipment room in mobile telecommunications systems and connected with remote radio head unit (RRU), via optical fiber. The baseband signal processor 206 of the primary sector 202 of the active repeater device 102 may be implemented as the baseband signal processor card, which is smaller in size and consumes less power in comparison with the conventional BBU.

Figure 3:
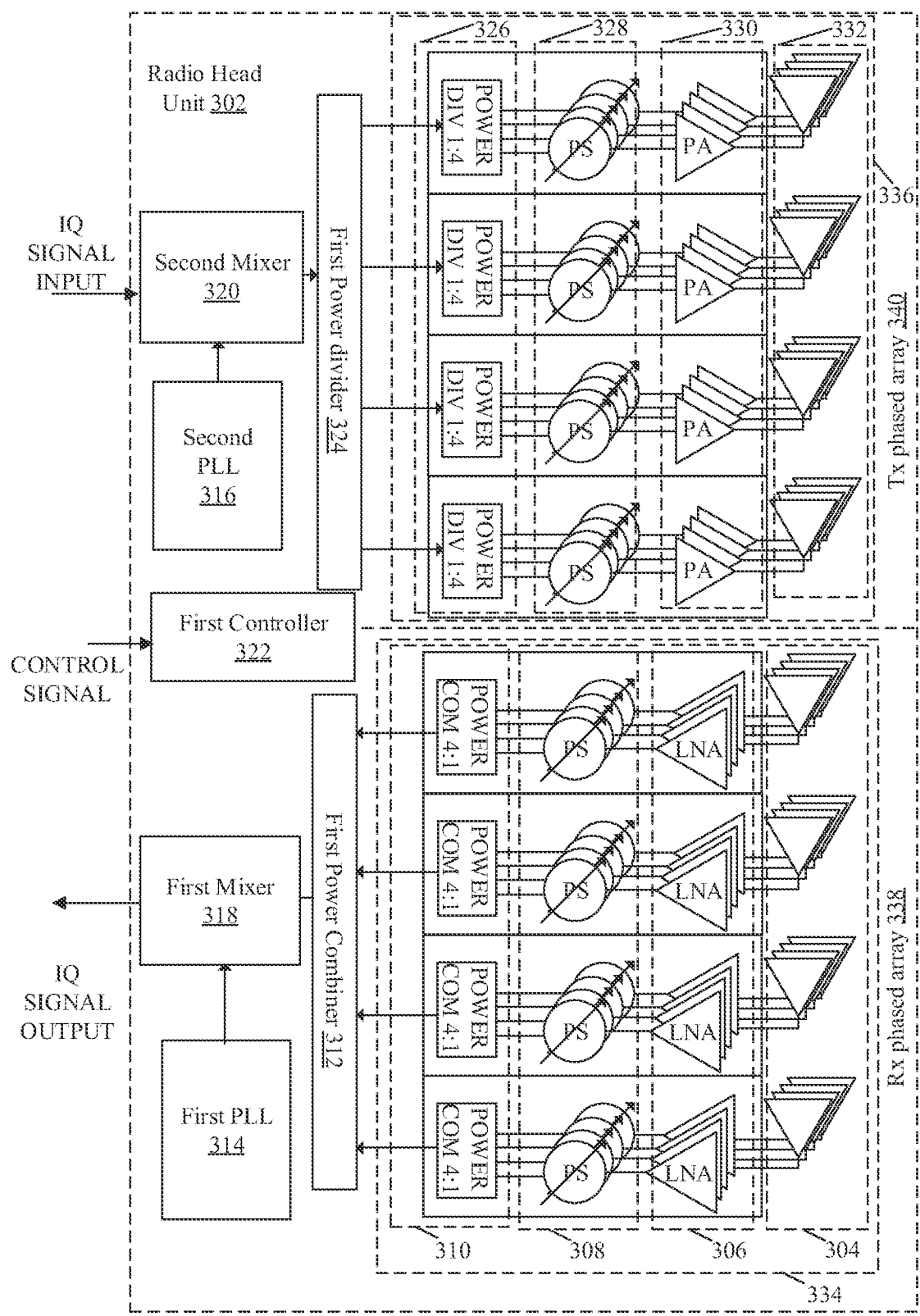
FIG. 3 depicts a circuit diagram illustrating various components of an exemplary radio head unit in an exemplary active repeater, in accordance with an exemplary embodiment of the disclosure.

FIG. 3 depict circuit diagrams illustrating various components of an exemplary radio head unit in the active repeater device to facilitate communication between multiple service providers and CPEs, in accordance with an exemplary embodiment of the disclosure. FIG. 3 is explained in conjunction with elements from FIGS. 1A, 1B, 1C, 2A, 2B, and 2C. With reference to FIG. 3, there is shown a radio head (RH) unit 302. The RH unit 302 may be one of the first RH unit 204, the second RH unit 210, the second RH unit 214 or any other radio head units in the active repeater device 102. The RH unit 302 comprises a receiver (Rx) phased array 338 and a transmitter (TX) phased array 340. The Rx phased array 338 may include a cascading receiver chain 334 comprising a first antenna array 304, a first set of low noise amplifiers (LNA) 306, a first set of phase shifters 308, and a first set of power combiners 310. The Tx phased array 340 may include a cascading transmitter chain 336 comprising a first set of power dividers 326, a first set of phase shifters 328, a first set of power amplifiers (PA) 330, and a second antenna array 332. There are is also shown a first power combiner 312, a first mixer 318, a second mixer 320, a first phase locked loop (PLL) 314, a second PLL 316, a first controller 322, and a first power divider 324 in the RH unit 302.

In accordance with an embodiment, the first antenna array 304 may be configured to receive the plurality of beams 114 of input RF signals from the plurality of base stations 104. The plurality of base stations 104 may be associated with a plurality of different service providers. The active repeater device 102 may be configured to serve the plurality of service providers. Therefore, cost of implementation of the active repeater device 102 may be borne collectively by the plurality of service providers. A conventional active repeater device may only serve a single service provider. Cost of installation of the conventional active repeater device may be borne by the single service provider which may be served by the conventional active repeater device. Hence, use of the active repeater device 102 may be more economical in comparison with use of the conventional active repeater device.

The first antenna array 304 may comprise a first set of antenna elements. The first antenna array 304 may be configured to receive the plurality of beams 114 of input RF signals using the first set of antenna elements. The plurality of beams 114 of input RF signals may include one or more full-bandwidth signals intended for the plurality of CPEs 106A to 106J. Examples of implementations of the first antenna array 304 may include, but is not limited to a linear phased array antenna, a planar phased array antenna, a frequency scanning phased array antenna, and a dynamic phased array antenna. The plurality of antenna elements in the first antenna array 304 may be communicatively coupled to one or more LNAs in the first set of LNAs 306.

The first set of LNAs 306 may be configured to amplify input RF signals received at the first antenna array 304. The first set of LNAs 306 may be configured to amplify input RF signals, which may have low-power, without significantly degrading corresponding signal-to-noise (SNR) ratio. Each of the first set of LNAs 306 may be communicatively coupled to phase shifters in the first set of phase shifters 308. The first set of phase shifters 308 may perform an adjustment in phase values of the input RF signals, till combined signal strength value of the received input RF signals, is maximized. In one example, the first set of phase shifters 308 may perform an adjustment in the phase value till each of the received input RF signals are in-phase with each other. Phase shifters in the first set of phase shifters 308 may be communicatively coupled to power combiners, such as a 4:1 power combiner, in the first set of power combiners 310. Further, each of the first set of power combiners 310 may be coupled to the first power combiner 312.

Each of the first set of power combiners 310 may be configured to combine each of the phase shifted input RF signals into a first set of RF signals. The first set of power combiners 310 may be configured to transmit the first set of RF signals to the first power combiner 312. The first power combiner 312 may be configured to combine the first set of RF signals to a first RF signal. The first power combiner 312 and the first set of power combiners 310 may comprise both active and passive combiners. Examples of implementation of the first power combiner 312 and the first set of power combiners 310 may include, but is not limited to resistive power combiners, and solid-state power combiners. The first power combiner 312 may be further configured to communicate the first RF signal to the first mixer 318.

The first mixer 318 may be configured to down convert the first RF signal to an output analogue baseband (IQ) signal. The first mixer 318 may be configured to down convert the first RF signal with a first frequency to the baseband signal based on mixing of a second frequency generated by a local oscillator with the first RF signal. The first mixer 318 may be communicatively coupled with the first PLL 314. The first PLL 314 in combination with the first mixer 318 may be configured to down convert the first Signal into an analog baseband quadrature (IQ) output signal. The first mixer 318 may be configured to communicate the IQ output signal to the baseband signal processor 206 via a first IQ signal cable.

The second mixer 320 may be configured to receive an analog baseband (IQ) input signal from the baseband signal processor 206 via the second IQ signal cable. Further, the second mixer 320 and the second PLL 316 may be configured to up convert the received IQ input signal to a second RF signal. The second mixer 320 may be configured to up convert the IQ input signal to the second RF signal based on mixing of a third frequency generated by a local oscillator with the IQ input signal. The second mixer 320 may be communicatively coupled to the first power divider 324. Further, each of the first set of power dividers 326 may be communicatively coupled to the first power divider 324. The combination of the second mixer 320 and the second PLL 316 may be configured to transmit the second RF signal to the first power divider 324.

The first controller 322 may be communicatively coupled to the baseband signal processor 206 via a control signal cable. The first controller 322 may be configured to receive one or more control signals from the baseband signal processor 206. The first controller 322 may be configured to adjust one or more parameters (e.g., amplifier gains, and phase responses) associated with the receiver (Rx) phased array 338 and the transmitter (Tx) phased array 340 based on the received one or more control signals. In one example, the first controller 322 may be configured to adjust amplifier gains of each of the first set of LNAs 306 and the first set of PAs 330 in the active repeater device 102. In another example, the first controller 322 may be configured to control each of the first set of phase shifters 308 and the second set of phase shifters 328, based on the received control signal.

Figure 4:
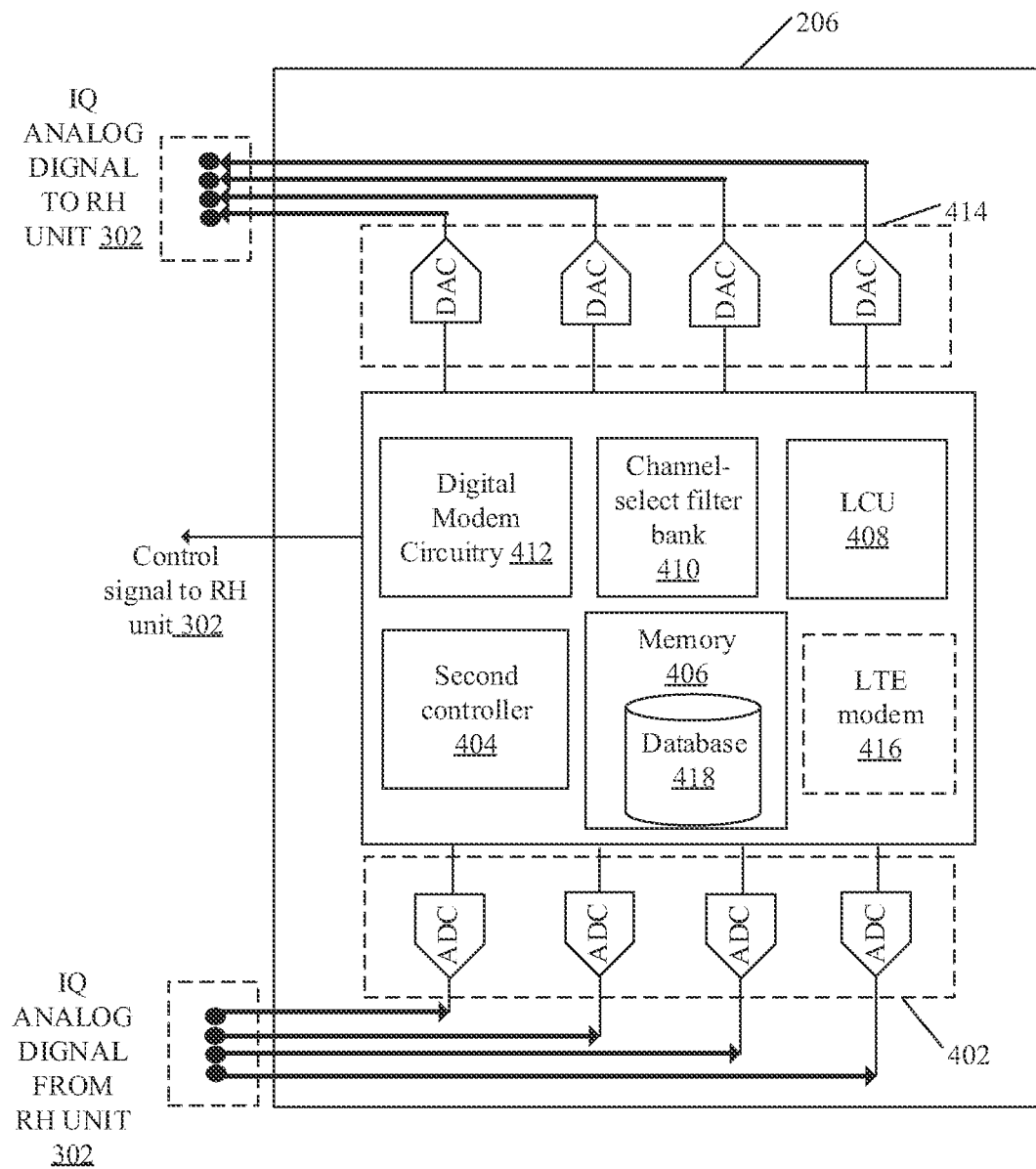
FIG. 4 depicts a block diagram illustrating various components of an exemplary baseband signal processor in an exemplary active repeater device, in accordance with an exemplary embodiment of the disclosure.

Further, the first controller 322 may be configured to receive beamforming coefficients from the baseband signal processor 206. The first controller 322, in association with the first set of phase shifters 308 and the first antenna array 304 may be configured to receive the plurality of beams 114 of input RF signals based on the received beamforming coefficients. The first controller 322 in association with the second set of phase shifters 328 and the second antenna array 332 may be configured to generate each beam of the plurality of beams 110 of output RF signals in the second antenna array 332 based on the received beamforming coefficients. In accordance with an embodiment, the first controller 322 may be configured to adjust phase shifts of a plurality of output RF signals using the second set of phase shifters 328 to generate each beam of the plurality of beams 110 of the output RF signals, based on the received control signal from the baseband signal processor 206 (FIG. 4).

In other embodiments, the first controller 322 may be configured to assign a different beam setting of a plurality of beam settings to each of the plurality of groups of CPEs 112. The first controller 322 may be configured to assign a first set of beam settings (comprising a first beam setting, a second beam setting, a third beam setting, and a fourth beam setting) of the plurality of beam settings to the plurality of groups of CPEs 112.

The first power divider 324 may be configured to split the second RF signal received from the second mixer 320. In one example, the first power divider 324 may comprise one or more input differential pair and two cascode pairs that may split output current into two or more branches. In another example, the first power divider 324 may further compensate for RF signal loss to achieve an efficient RF power transfer. In another example, the first power divider 324 may be configured to split the second RF signal into a second set of RF signals. The first power divider 324 may be configured to communicate the second set of RF signals into the first set of power dividers 326. The first set of power dividers 326 may be configured to further split the second set of RF signals into a plurality of RF signals. The first set of power dividers 326 may be communicatively coupled to the second set of phase shifters 328.

The second set of phase shifters 328 may be configured to receive the plurality of RF signals from the first set of power dividers 326. The second set of phase shifters 328 may be configured to perform a phase shift on each of the plurality of RF signals for beam forming (e.g. synthesis of a wider beam) of the plurality of RF signals based on beamforming coefficients received from the baseband signal processor 206. The control information may be received by the first controller 322 and processed in conjunction with the second set of phase shifters 328. The second set of phase shifters 328 may be configured to transmit the plurality of phase shifted RF signals to the first set of PAs 330 The second set of phase shifters 328 may be configured to transmit the plurality of phase shifted RF signals to the first set of PAs 330.

The first set of PAs 330 may be configured to adjust an amplification gain of each of the plurality of RF signals on which phase shift has been performed by the second set of phase shifters 328. The amplification gain of each of the plurality of RF signals may be adjusted based on the control signal received from the first controller 322. The amplification gain of each of the plurality of RF signals may be adjusted based on the control signal received from the first controller 322. The first set of PAs 330 may be configured to transmit the plurality of RF signals to the second antenna array 332.

In accordance with an embodiment, the second antenna array 332 may be configured to transmit the plurality of beams 110 having a second beam pattern of the plurality of output RF signals to the plurality of CPEs 106A to 106J. In accordance with an embodiment, the second antenna array 332 may be a phased array antenna. The second antenna array 332 may comprise a second set of antenna elements. The second antenna array 332 may be configured to transmit the plurality of output RF signals by use of the second set of antenna elements. The second antenna array 332 may be configured to relay the plurality of output RF signals to the plurality of base stations 104 in the first beam pattern in the uplink communication. Examples of implementations of the first antenna array 304 may include, but is not limited to a linear phased array antenna, a planar phased array antenna, a frequency scanning phased array antenna, a dynamic phased array antenna, and a passive phased array antenna.

In operation, the first antenna array 304 may be configured to receive the plurality of beams 114 of input RF signals. In one example, the first antenna array 304 may be configured to receive the plurality of beams 114 of input RF signals from the plurality of base stations 104. In one example, the active repeater device 102 may be configured to be activated when the first antenna array 304 receives the plurality of beams 114 of input RF signals from the plurality of base stations 104 (or another active repeater device 102). In such a case, the second antenna array 332 of the TX phased array 340 may transmit the plurality of beams 110 of one or more output RF signals based on the received input RF signals, to the plurality of groups of CPEs 112.

The first set of LNAs 306 in the RH unit 302 may be configured to adjust a first amplification gain of each of the received input RF signals. The first set of phase shifters 308 may be configured to perform a first phase shift on each of the input RF signals with the adjusted first amplification gain. It may be noted that the first amplification gain of the first set of LNAs 306 may be adjusted by the first controller 322 based on the received control signal from the baseband signal processor 206. Similarly, the first phase shifts of input RF signals may be adjusted by the first controller 322 using the first set of phase shifters 308 based on the received control signal from the baseband signal processor 206. In accordance with an embodiment, the first set of power combiners 310, and the first power combiner 312 in combination, may be configured to combine the input RF signals to generate the first RF signal. The first RF signal may be down converted by the combination of the first mixer 318 and the first PLL 314 to an IQ output signal. The IQ output signal may be communicated by the combination of the first mixer 318 and the first PLL 314 to the baseband signal processor 206 via an IQ signal cable.

In accordance with an embodiment, the second mixer 320 may be configured to receive the IQ input signal from the baseband signal processor 206 via a second IQ signal cable. In accordance with an embodiment, the IQ input signal may be up converted by the combination of the second mixer 320 and the second PLL 316 to a second RF signal. The first power divider 324 may be configured to split the second RF signal into a second set of RF signals. The first set of power dividers 326 may be configured to further split the second set of RF signals into one or more output RF signals. In accordance with an embodiment, the second set of phase shifters 328 may be configured to adjust phase values of each of the output RF signals. Furthermore, the first set of PAs 330 may be configured to adjust an amplification gain of each of the output RF signals on which phase shift has been performed by the second set of phase shifters 328.

The second antenna array 332 may be configured to generate the plurality of beams 110 of output RF signals, based on the adjusted phase shifts and the adjusted amplification gains of each of the output RF signals. The generated plurality of beams 110 of output RF signals may comprise the first beam 110A of output RF signals, the second beam 110B of output RF signals, the third beam 110C of output RF signals, and the fourth beam 110D of output RF signals.

The second antenna array 332 may be configured to concurrently transmit the plurality of beams 110 of output RF signals to the plurality of groups of CPEs 112. The full-bandwidth signal received from the plurality of base stations 104 may be re-transmitted concurrently to the plurality of groups of CPEs 112 over the plurality of beams 110 of output RF signals. The second antenna array 332 may be configured to concurrently transmit the plurality of beams 110 based on the assigned different beam setting to each of the plurality of groups of CPEs 112.

Each beam of the plurality of beams 110 of output RF signals may be transmitted exclusively to a corresponding group of the plurality of groups of CPEs 112. For example, the active repeater device 102 may be configured to transmit the first beam 110A to the first group of CPEs 112A. Similarly, the active repeater device 102 may be configured to transmit the second beam 110B, the third beam 110C, and the fourth beam 110D to the second group of CPEs 112B, the third group of CPEs 112C and the fourth group of CPEs 112D respectively. Unlike the active repeater device 102, a conventional active repeater may transmit a single wide beam to communicate with the plurality of CPEs 106A to 106J. However, the single wide beam used by the conventional active repeater device may be wider in comparison with each of the plurality of beams 110 of output RF signals transmitted to the plurality of groups of CPEs 112. A person with ordinary skill in art may understand that wide beams of RF signals have lesser transmission range than narrow beams of RF signals. Hence, each of the plurality of beams 110 of output RF signals may have a transmission range which may be larger in comparison with a transmission range of the single wide beam transmitted by the conventional active repeater device. Hence, the active repeater device 102 may have larger transmission range in comparison to the conventional active repeater device.

In accordance with an embodiment, the active repeater device 102 may function in a phase-only excitation beamforming mode. In the phase-only excitation beamforming mode, the generation of each of the plurality of beams 110 by the second antenna array 332 may be based on the adjustment of the phase shifts of the output RF signals using the second set of phase shifters 328 by the first controller 322. The first controller 322 may be configured to generate each of the plurality of beams 110 of output RF signals independent of amplitude tapering of the second antenna array 332. The active repeater device 102 may be configured to generate each of the plurality of beams 110 of output RF signals exclusively based on adjusting phase shifts of output RF signals using the second set of phase shifters 328 and independent of changes in amplitude of the RF output signals. The first controller 322 may be configured to adjust the phase shifts based on a quadratic phase distribution scheme.

In accordance with an embodiment, the active repeater device 102 may function in a superposition mode. In the superposition mode, the first controller 322 may be configured to partition the second set of antenna elements of the second antenna array 332 into a plurality of spatially separated antenna sub-arrays. The second antenna array 332 may be configured to generate a first set of beams of output RF signals based on the partition. Each of the plurality of spatially separated antenna sub-arrays may generate one or more of the first set of beams. Each beam of the plurality of beams 110 of output RF signals may be generated by super-position of the first set of beams of output RF signals with each other.

In accordance with an exemplary aspect, the active repeater device 102 may be configured to transmit the plurality of beams 110 of output RF signals during a plurality of available timeslots of a particular transmission time period. In such cases, the first controller 322 may be configured to assign a different set of beam settings (such as the first set of beam settings) to the plurality of groups of CPEs 112 for each of the plurality of available timeslots. The second antenna array 332 may be configured to transmit the plurality of beams 110 of output RF signals based on the assignment of the different sets of beam settings to the plurality of groups of CPEs 112 for the plurality of available timeslots. For example, at a first timeslot "Ts1" of the plurality of available timeslots, the second antenna array 332 may be configured to transmit the plurality of beams 110 of output signals based on the first set of beam settings. Similarly, the second antenna array 332 may be configured to transmit the plurality of beams 110 of output RF signals at a second timeslot "Ts2", a third timeslot "Ts3", a fourth timeslot "Ts4", and a fifth timeslot "Ts5", based on a second set of beam settings, a third set of beam settings, a fourth set of beam settings, and a fifth set of beam settings, respectively.

FIG. 4 depicts a block diagram illustrating various components of an exemplary baseband signal processor in the active repeater device to facilitate communication between multiple service providers and customer premises equipment (CPEs), in accordance with an exemplary embodiment of the disclosure. FIG. 4 is explained in conjunction with elements from FIGS. 1A, 1B, 1C, 2A, 2B, 2C, and 3. With reference to FIG. 4, there is shown the baseband signal processor 206.

The baseband signal processor 206 comprises a first set of analog to digital converters (ADC) 402, a second controller 404, a memory 406, a transmitter receiver control sector-sector routing multiplexer logic control unit (hereafter referred to as Logical control unit 408 (LCU)), a channel-select filter bank 410, a digital modem circuitry 412, and a first set of digital to analog circuitry (DAC) 414. In some embodiments, the baseband signal processor 206 may also include a Long Term Evolution (LTE) modem 416. In some embodiments, the baseband signal processor 206 may not include the LTE modem 416. In accordance with an embodiment, the second controller 404 may be a digital signal processor. In accordance with an embodiment, the memory 406 may store code and logic which may correspond to a plurality of digital filters, a plurality of signal processing algorithms, a plurality of signal encoding algorithms, and a plurality of signal decoding algorithms. Further, the channel select filter bank 410 may comprise a plurality of channel select filters. The memory 406 may be configured to store a database 418 comprising a plurality of beam settings. Each of the plurality of beam settings comprises a set of beam-forming coefficients. Each of the plurality of beam settings may correspond to a different beam profile of the plurality of different beams transmitted by a second antenna array (e.g. the second antenna array 332) in a second RH unit (such as the RH unit 302).

The baseband signal processor 206 may be communicatively coupled with one or more RH units (referred to as a first set of RH units) based on the implementation of the active repeater device 102 as the one-, two-, or three-sector active repeater device as discussed in FIGS. 2A, 2B, and 2C. An example of RH units in the first set of RH units may include, but is not limited to the first RH unit 204, the second RH unit 210, and the second RH unit 214. The baseband signal processor 206 may be communicatively coupled to RH units in the first set of RH units via one or more IQ signal cables and control signal cables.

In operation, the baseband signal processor 206 may be configured to receive a first set of IQ analog signals from the first set of RH units. Each IQ signal of the first set of IQ signals may be received by the baseband signal processor 206, from a corresponding RH unit in the first set of RH units. Thereafter, the first set of ADCs 402 may be configured to convert the first set of analog IQ signals to the first set of coded data signals. Thus, in other words, the first set of coded data signals may correspond to input RF signals received from the plurality of base stations 104 and the plurality of CPEs 106A to 106J. The digital modem circuitry 412 may be configured to extract control information from the first set of coded data signals. It has been mentioned that the first set of coded data signal comprises a sequence of frames. The sequence of frames may comprise data frames and control frames. The digital modem circuitry 412 may be configured to demodulate header portions of frames in the first set of coded data signals to extract the control information, as discussed in FIG. 1.

In accordance with an embodiment, the second controller 404 may be configured to analyze the extracted control information to determine destination receivers for each of the first set of coded data signals. The destination receivers may be receivers of RF devices, to which the input RF signals associated with the first set of coded data signals are intended to be transmitted from a source transmitter. Examples of such RF devices may include, but is not limited to the plurality of CPEs 106A to 106J, the plurality of base stations 104, and/or any other active repeater devices. Further, the LCU 408 may be configured to assign each of the first set of coded data signals to one or more of the first set of RH units (the first RH unit 204, the second RH unit 210, and the second RH unit 214) based on the determined destination receivers. In accordance with an embodiment, the first set of DACs 414 may be configured to convert the first set of coded data signals to a second set of IQ analog signals. Each of the second set of IQ analog signals may correspond to a coded data signal in the first set of coded data signals. The baseband signal processor 206 may be configured to transmit each of the second set of IQ analog signals to one or more of the first set of RH units based on assignment of the first set of coded data signals by the LCU 408.

In certain scenarios where the input RF signals are received from the plurality of CPEs 106A to 106J, a first set of coded data signals may be generated similar to input RF signals received from the plurality of base stations 104, as discussed. In such cases, the second controller 404 in the baseband signal processor 206 may be configured to measure a received signal strength indicator (RSSI) of each of the first set of coded digital signals in digital domain. The second controller 404 may be further configured to filter the first set of coded data signals based on one or more channel select filters in the channel-select filter bank 410. The second controller 404 may be configured to suppress adjacent channel signals in the first set of coded data signals by applying the channel select filters on the first set of coded data signals. By suppression of the adjacent channel signals in the first set of coded data signals, the second controller 404 may be configured to increase accuracy of the RSSI measurement in digital domain.

In accordance with an embodiment, the second controller 404 may be configured to assign a different beam setting from the plurality of beam settings stored in the memory 406 to each of the plurality of groups of CPEs 112, based on one or more signal parameters (such as the measured RSSI) associated with the plurality of groups of CPEs 112. The active repeater device 102 may be configured to assign a first set of beam settings (comprising a first beam setting, a second beam setting, a third beam setting, and a fourth beam setting) to the plurality of groups of CPEs 112. For example, the first beam setting, the second beam setting, the third beam setting, and the fourth beam setting of the plurality of beam settings, may be assigned to the first group of CPEs 112A, the second group of CPEs 112B, the third group of CPEs 112C, and the fourth group of CPEs 112D of the plurality of groups of CPEs 112 respectively.

In certain scenarios, the active repeater device 102 may be configured to transmit the plurality of beams 110 of output RF signals during a plurality of available timeslots of a particular transmission time period. In such cases, the second controller 404 may be configured to assign a different set of beam settings (such as the first set of beam settings) to the plurality of groups of CPEs 112 for each of the plurality of available timeslots. The active repeater device 102 may be configured to transmit the plurality of beams 110 of output RF signals based on the assignment of the different sets of beam settings to the plurality of groups of CPEs 112 for the plurality of available timeslots. For example, at a first timeslot "Ts1" of the plurality of available timeslots, the active repeater device 102 may be configured to transmit the plurality of beams 110 of output signals based on the first set of beam settings. Similarly, the active repeater device 102 may be configured to transmit the plurality of beams 110 of output signals at a second timeslot "Ts2", a third timeslot "Ts3", a fourth timeslot "Ts4", and a fifth timeslot "Ts5", based on a second set of beam settings, a third set of beam settings, a fourth set of beam settings, and a fifth set of beam settings respectively.

In accordance with an embodiment, the second controller 404 may generate one or more control signals based on the extracted control information and the measured RSSI. The control signals may be further generated based on the assignment of the different beam setting to each group of the plurality of groups of CPEs 112. The second controller 404 may transmit the generated control signals to one or more of the first set of RH units (the first RH unit 204, the second RH unit 210, and the second RH unit 214). The one or more control signals may be received by the first controller 322 in an RH unit (such as the RH unit 302) in the first set of RH units (the first RH unit 204, the second RH unit 210, and the second RH unit 214). The first controller 322 may be configured to adjust amplification gains of the first set of LNAs 306 of the Rx phased array 338 based on the received one or more control signals from the second controller 404. The second controller 404 may thereby, adjust gain distribution within the Rx phased array 338 based on the measured RSSI. Further, the first controller 322 may be configured to adjust amplitude gains of the first set of PAs 330 in the cascading transmitter chain 336, based on the received one or more control signals from the second controller 404. Alternatively stated, the second controller 404 in association with the first controller 322 may adjust gain distribution within the cascading receiver chain 334 based on the measured RSSI.

In accordance with an embodiment, the second controller 404 may acquire beamforming coefficients which may correspond to the plurality of beam setting stored in the memory 406. The second controller 404 may transmit the acquired beamforming coefficients to one or more of the first set of RH units (the first RH unit 204, the second RH unit 210, and the second RH unit 214). The beamforming coefficients may be received by the first controller 322 in an RH unit (such as the RH unit 302) in the first set of RH units (the first RH unit 204, the second RH unit 210, and the second RH unit 214). The first controller 322 in association with the first set of phase shifters 308 and the first antenna array 304 may be configured to reconfigure the first antenna array 304 to receive the plurality of beam 114 of input RF signals in the first antenna array 304 based on the received beamforming coefficients.

In accordance with an embodiment, the second antenna array 332 may be configured to concurrently transmit the plurality of beams 110 of output RF signals to the plurality of groups of CPEs 112. The full-bandwidth signal received from the plurality of base stations 104 may be re-transmitted concurrently to the plurality of groups of CPEs 112 over the plurality of beams 110 of output RF signals.

In accordance with an embodiment, the first controller 322 may be configured to adjust phase shifts of a plurality of output RF signals using the second set of phase shifters 328 to generate a second beam of the plurality of output RF signals, based on the received beamforming coefficients. In some embodiments, the second controller 404 and the first controller 322 may be implemented as a single controller.

In accordance with an embodiment, the LTE modem 416 may be configured to perform one or more tasks such as configuring and monitoring beamforming functions of the active repeater device 102. The LTE modem 416 may be further configured to perform timing synchronization and frequency synchronization with each of the plurality of base stations 104 and the plurality of CPEs 106A to 106J.

Figure 5A:
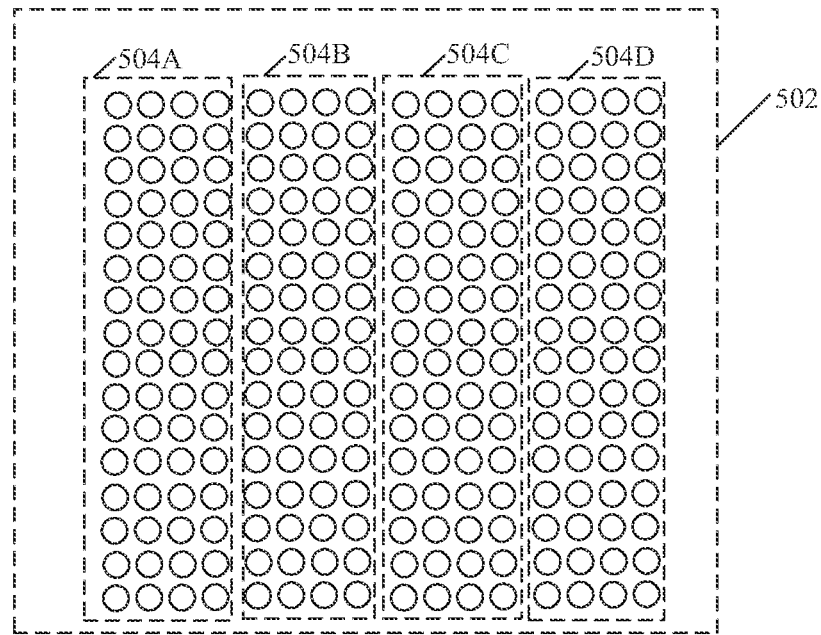
FIG. 5A illustrates a second antenna array in a secondary sector of an exemplary active repeater device, for logical partitioning of antenna elements to generate separate beams of output RF signals based on superposition of antenna sub-arrays, in accordance with an exemplary embodiment of the disclosure.

FIG. 5A illustrates an exemplary antenna array in an exemplary active repeater device for logical partitioning of antenna elements to generate separate beams of output RF signals based on superposition of antenna sub-arrays, in accordance with an exemplary embodiment of the disclosure. FIG. 5A is explained in conjunction with elements from FIGS. 1A, 1B, 1C, 2A, 2B, 2C, 3, and 4. With reference to FIG. 5A, there is shown an antenna array 502 of the active repeater device 102. In one example, the antenna array 502 may correspond to the second antenna array 332 (FIG. 3).

The antenna array 502 may comprise a set of antenna elements. The first controller 322 may be configured to partition the set of antenna elements of the antenna array 502 into a plurality of spatially separated antenna sub-arrays 504A, 504B, 504C, and 504D. The plurality of spatially separated antenna sub-arrays 504A, 504B, 504C, and 504D may comprise a first antenna sub-array 504A, a second antenna sub-array 504B, a third antenna sub-array 504C, and a fourth antenna sub-array 504D. In one example, the antenna array 502 may comprise 256 antenna elements and has 16 rows and 16 columns. Each of the plurality of spatially separated antenna sub-arrays 504A, 504B, 504C, and 504D comprises 64 elements each. The antenna array 502 may be configured to generate a first set of beams of output RF signals based on the partition. Each of the first set of beams may be generated by a corresponding antenna sub array of the plurality of spatially separated antenna sub-arrays 504. Further, each beam of the plurality of beams 110 of output RF signals may be generated by super-position of the first set of beams of output RF signals with each other. Generation of the each beam of the plurality of beams 110 of output RF signals has been explained in detail, for example, in FIG. 5B and FIG. 5C.

Figure 5B:
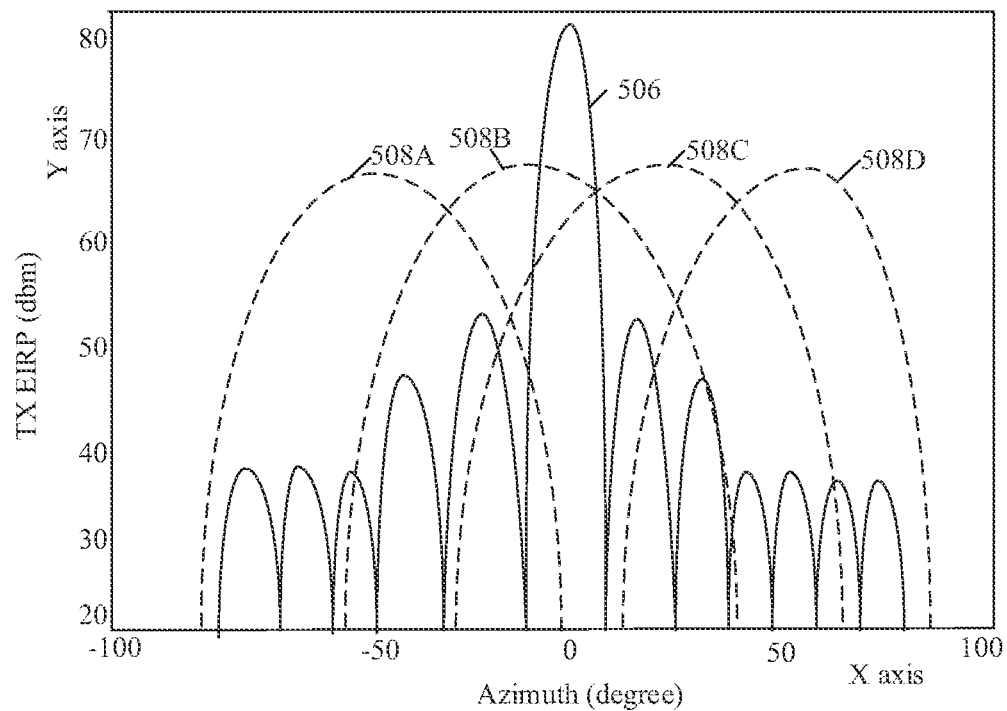
FIG. 5B depicts a first graph illustrating variation of effective isotropic radiated power (EIRP) with respect to azimuth angle of a second antenna array in an exemplary active repeater device to facilitate communication with CPEs, in accordance with an exemplary embodiment of the disclosure.

FIG. 5B is a first graph illustrating effective isotropic radiated power (EIRP) of an exemplary antenna array in an exemplary active repeater device to facilitate communication with multiple CPEs, in accordance with an exemplary embodiment of the disclosure. FIG. 5B is explained in conjunction with elements from FIGS. 1A, 1B, 1C, 2A, 2B, 2C, 3, 4, and 5A. With reference to FIG. 5B, there is shown a first graph which depicts EIRP of the antenna array 502 with respect to azimuth angle of the antenna array 502 of FIG. 5A.

The azimuth angle with respect to a horizontal plane of the antenna array 502 may be represented by the "X" axis of the first graph as shown. The EIRP may be represented by the "Y" axis of the first graph as shown. In certain scenarios, the antenna array 502 may be configured to generate a narrow beam (as represented by graph component 506). In other scenarios, the first controller 322 may be configured to partition the antenna array 502 into the plurality of spatially separated antenna sub-arrays 504A, 504B, 504C, and 504D. The antenna array 502 may be configured to generate the first set of beams 508A, 508B, 508C, and 508D based on the partition. The first antenna sub-array 504A (FIG. 5A) may be configured to generate a beam (EIRP of the generated beam is represented by graph component 508A) of the first set of beams. Similarly, the second antenna sub-array 504B, the third antenna sub-array 504C, and the fourth antenna sub-array 504D may be configured to generate respective beams (EIRP of the respective beams are represented by graph components 508B, 508C, and 508D respectively) of the first set of beams.

Figure 5C:
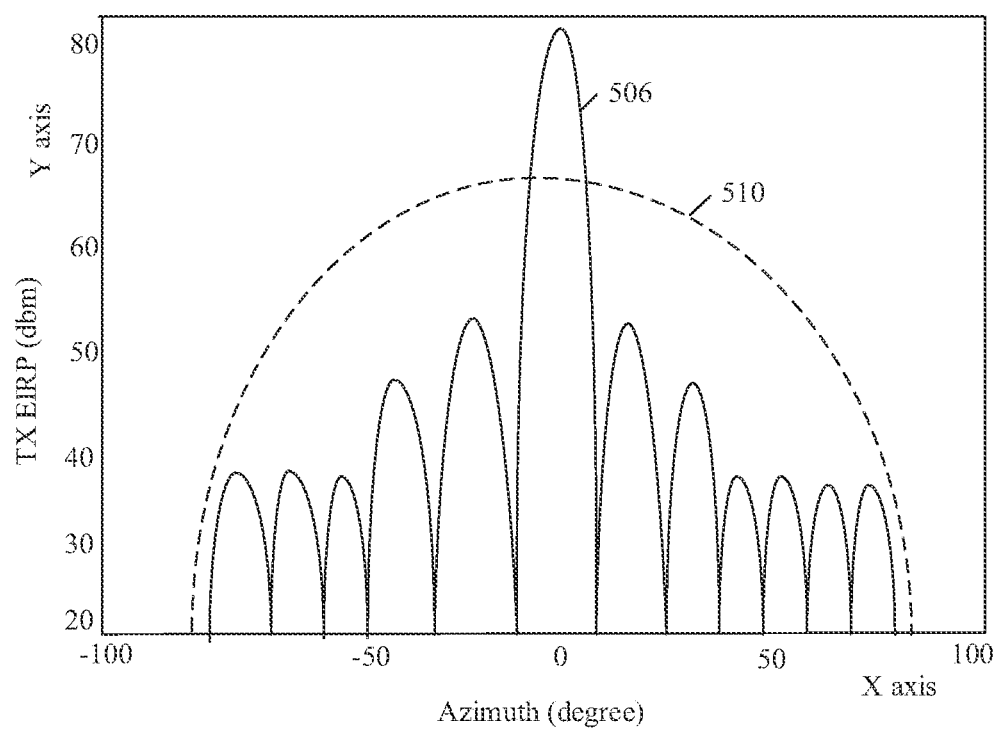
FIG. 5C depicts a second graph illustrating variation of effective isotropic radiated power (EIRP) with respect to azimuth angle of a second antenna array in an exemplary active repeater device to facilitate communication with CPEs, in accordance with an exemplary embodiment of the disclosure.

FIG. 5C is a second graph illustrating effective isotropic radiated power (EIRP) of an exemplary antenna array in an exemplary active repeater device to facilitate communication between multiple service providers and customer premises equipment (CPEs), in accordance with an exemplary embodiment of the disclosure. The first set of beams (represented by graph components 508A, 508B, 508C, and 508D (FIG. 5B)) may superpose with each other to generate each beam of the plurality of beams 110 (as represented by graph component 510) of output RF signals.

Figure 5D:
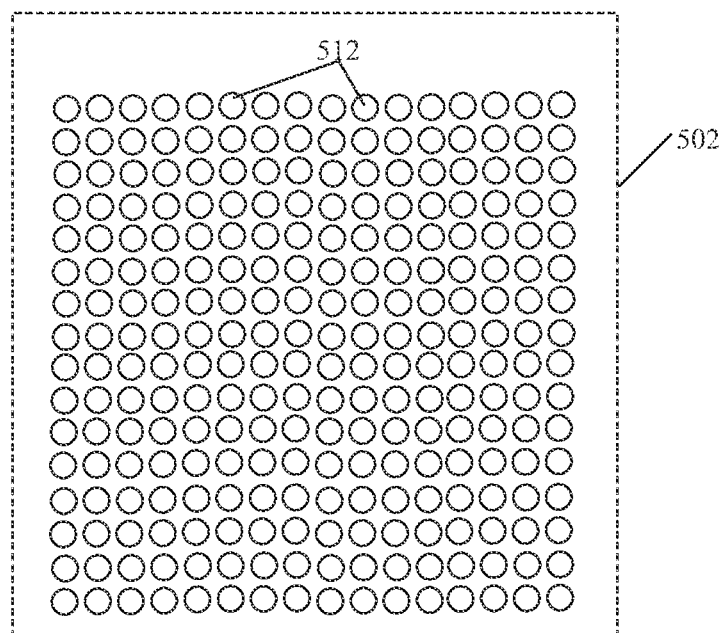
FIG. 5D depicts a block diagram illustrating a second antenna array of an exemplary active repeater device configured to generate a plurality of beams of output RF signals based on phase-only excitation of antenna elements, in accordance with an exemplary embodiment of the disclosure.

FIG. 5D illustrates an exemplary antenna array in an exemplary active repeater device to facilitate communication with multiple CPEs, in accordance with an exemplary embodiment of the disclosure. FIG. 5D is explained in conjunction with elements from FIGS. 1A, 1B, 1C, 2A, 2B, 2C, 3, 4, 5A, 5B, and 5C. With reference to FIG. 5D, there is shown the antenna array 502 of the active repeater device 102. The antenna array 502 may comprise a plurality of antenna elements 512. Each of the plurality of antenna elements 512 may be coupled with the second set of phase shifters 328 (of FIG. 3). The first controller 322 may be configured to adjust phase shifts of output RF signals using the second set of phase shifters 328 to generate each beam of the plurality of beams 110 of output RF signals, based on a predefined criterion. The generation of each beam of the plurality of beams 110 by the second antenna array 332 is based on the adjustment of the phase shifts of the output RF signals using the second set of phase shifters 328 independent of changes in amplitude of the output RF signals.

Figure 6A:
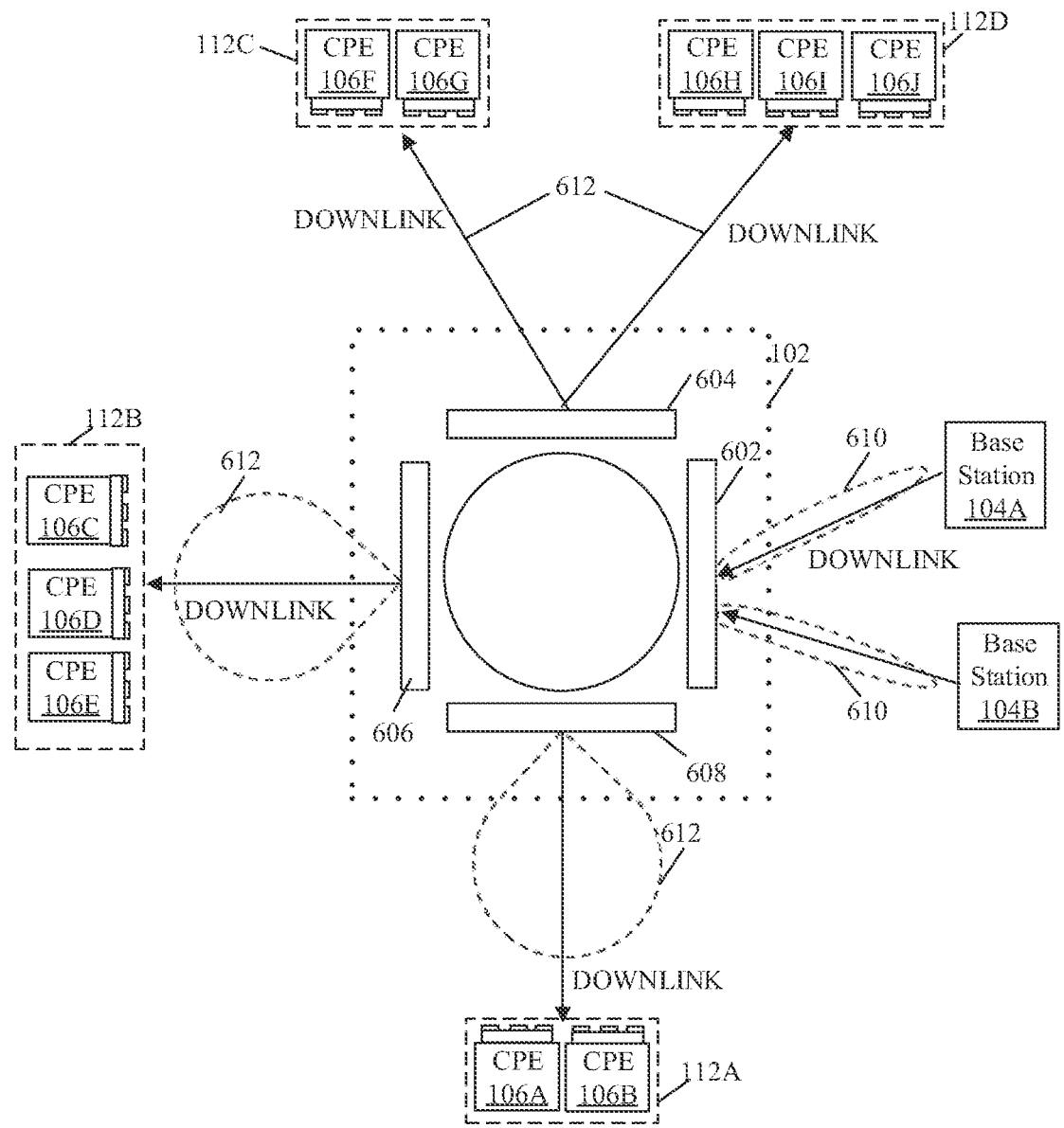
FIG. 6A illustrates a first exemplary scenario for implementation of the active repeater device, in accordance with an embodiment of the disclosure.

FIG. 6A illustrates a first exemplary scenario for implementation of the active repeater device, in accordance with an embodiment of the disclosure. FIG. 6A is explained in conjunction with elements from FIGS. 1A, 1B, 1C, 2A, 2B, 2C, 3, 4, and 5A to 5D. The active repeater device 102 may comprise one or more sectors, such as a primary sector 602, and one or more secondary sectors 604, 606, and 608. The primary sector 602 may correspond to the primary sector 202. The one or more secondary sectors 604, 606, and 608 may correspond to the secondary sectors 208 and 212. (FIGS. 2B and 2C).

The primary sector 602 and each of the one or more secondary sectors 604, 606, and 608, after installation at a defined location (e.g. around a post or pillar), may be configured to cover a portion of a 360-degree scan range for communication among the plurality of base stations 104, the plurality of groups of CPEs 112, or another repeater device. The active repeater device 102 may receive the plurality of beams 114 of input RF signals having a first beam pattern 610 from the plurality of base stations 104 (as discussed in FIG. 1). Each of the plurality of beams 114 of input RF signals may be a narrow beam or a pencil-beam. The plurality of beams 114 of input RF signals includes a full-bandwidth signal intended for the plurality of groups of CPEs 112 (as discussed in FIG. 1).

The plurality of base stations 104 may be associated with a plurality of different service providers. The active repeater device 102 may be shareable by the plurality of different service providers in a cost-effective manner in comparison with use of the conventional active repeater device.

The second controller 404 of the baseband signal processor 206 may be configured to assign a different beam setting from the plurality of beam settings to each of the plurality of groups of CPEs 112, based on one or more signal parameters associated with the plurality of groups of CPEs 112. Each of the one or more secondary sectors 604, 606, and 608 may be communicatively coupled to the primary sector 602. The one or more secondary sectors 604, 606, and 608 may be configured to generate the plurality of beams 110 of output RF signals based on the received input RF signals (as discussed in FIG. 1). The one or more secondary sectors 604, 606, and 608 may be configured to concurrently transmit the plurality of beams 110 of output RF signals to the plurality of groups of CPEs 112 based on the assigned different beam setting to each of the plurality of groups of CPEs 112, and the received plurality of beams 114 of input RF signals from the plurality of base stations 104. The full-bandwidth signal received from the plurality of base stations 104 may be re-transmitted concurrently to the plurality of groups of CPEs 112 over the plurality of beams 110 of output RF signals. Each of the plurality of beams 110 may have a second beam pattern 612.

Each beam of the plurality of beams 110 of output RF signals may be transmitted exclusively to a corresponding group of the plurality of groups of CPEs 112. For example, the active repeater device 102 may be configured to transmit the first beam 110A to the first group of CPEs 112A. Similarly, the active repeater device 102 may be configured to transmit the second beam 110B, the third beam 110C, and the fourth beam 110D to the second group of CPEs 112B, the third group of CPEs 112C and the fourth group of CPEs 112D respectively. Unlike the active repeater device 102, a conventional active repeater may transmit a single wide beam to communicate with the plurality of CPEs 106A to 106J. However, the single wide beam used by the conventional active repeater device may be wider in comparison with each of the plurality of beams 110 of output RF signals transmitted to the plurality of groups of CPEs 112. A person with ordinary skill in art may understand that wide beams of RF signals have lesser transmission range than narrow beams of RF signals. Hence, each of the plurality of beams 110 of output RF signals may have a transmission range which may be larger in comparison with a transmission range of the single wide beam transmitted by the conventional active repeater device. Hence, the active repeater device 102 may have larger transmission range in comparison to the conventional active repeater device.

Figure 6B:
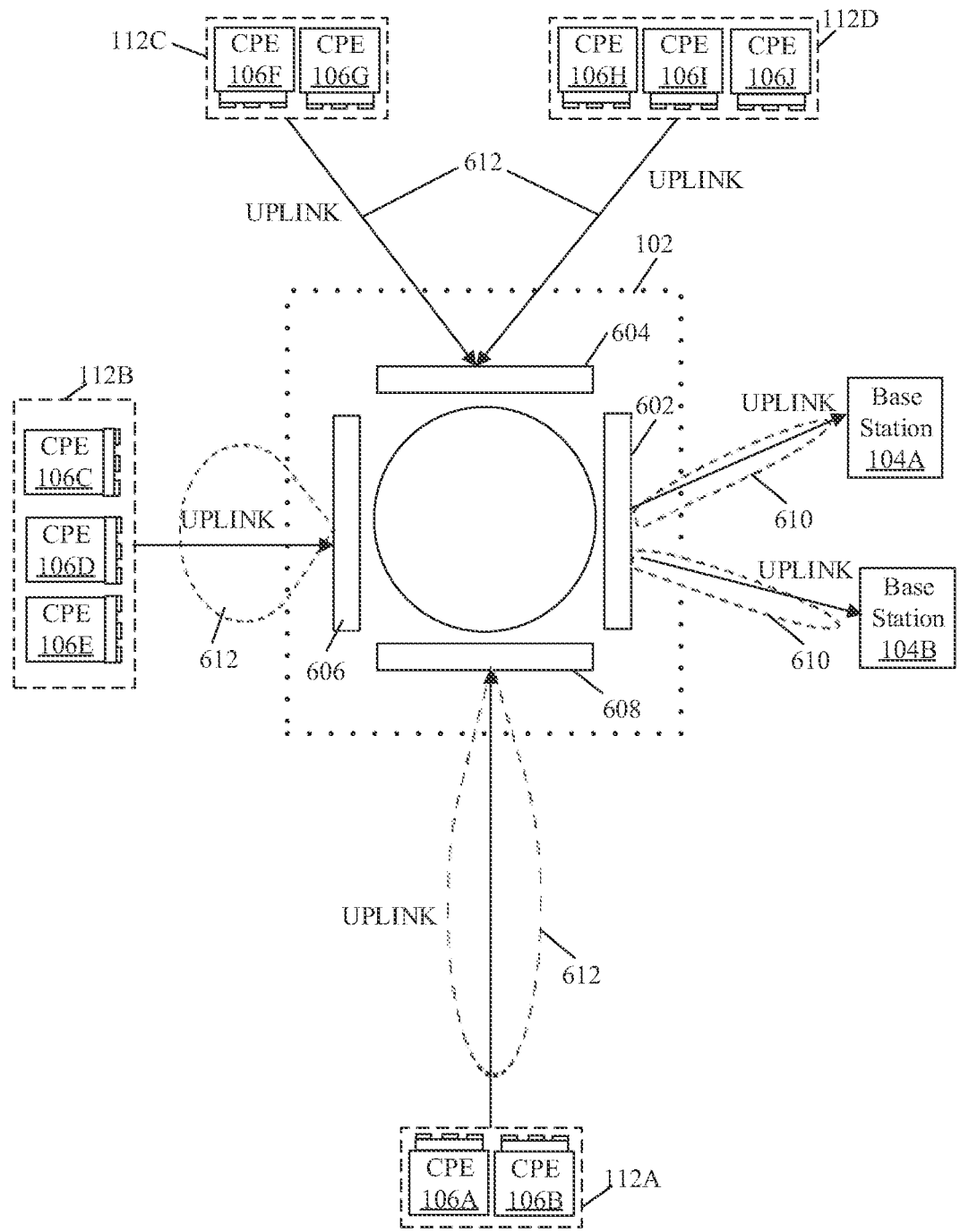
FIG. 6B illustrates a second exemplary scenario for implementation of the active repeater device, in accordance with an embodiment of the disclosure.

FIG. 6B illustrates a second exemplary scenario for implementation of the active repeater device, in accordance with an embodiment of the disclosure. FIG. 6B is explained in conjunction with elements from FIGS. 1A, 1B, 1C, 2A, 2B, 2C, 3, 4, 5A to 5D, and 6A. The active repeater device 102 may comprise a plurality of first antenna arrays (e.g. the first antenna array 304 in FIG. 3) and a plurality of second antenna arrays (e.g. the second antenna array 332 in FIG. 3) in primary sector 602 and the one or more secondary sectors (such as the secondary sector 604, the secondary sector 606, and the secondary sector 608). The plurality of first antenna arrays in the one or more secondary sectors 604, 606, and 608 may be configured to receive different input RF signals from the plurality of groups of CPEs 112 through different beam patterns and distances in an uplink communication, as shown. The received different input RF signals from the plurality of groups of CPEs 112 may be superimposed by the primary sector 602. The primary sector 602 (e.g. the second antenna array 332 in the primary sector 602) may be configured to transmit the received different input RF signals to the plurality of base stations 104 in the uplink communication as two streams, one each for one base station, i.e., one stream for the first base station 104*a* and another stream for the second base station 104*b*, in the first beam pattern 610 to achieve higher transmission range between the plurality of base stations 104 and the active repeater device 102. The single stream may include full frequency channel that corresponds to the different input RF signals received from the plurality of groups of CPEs 112.

Figure 7:
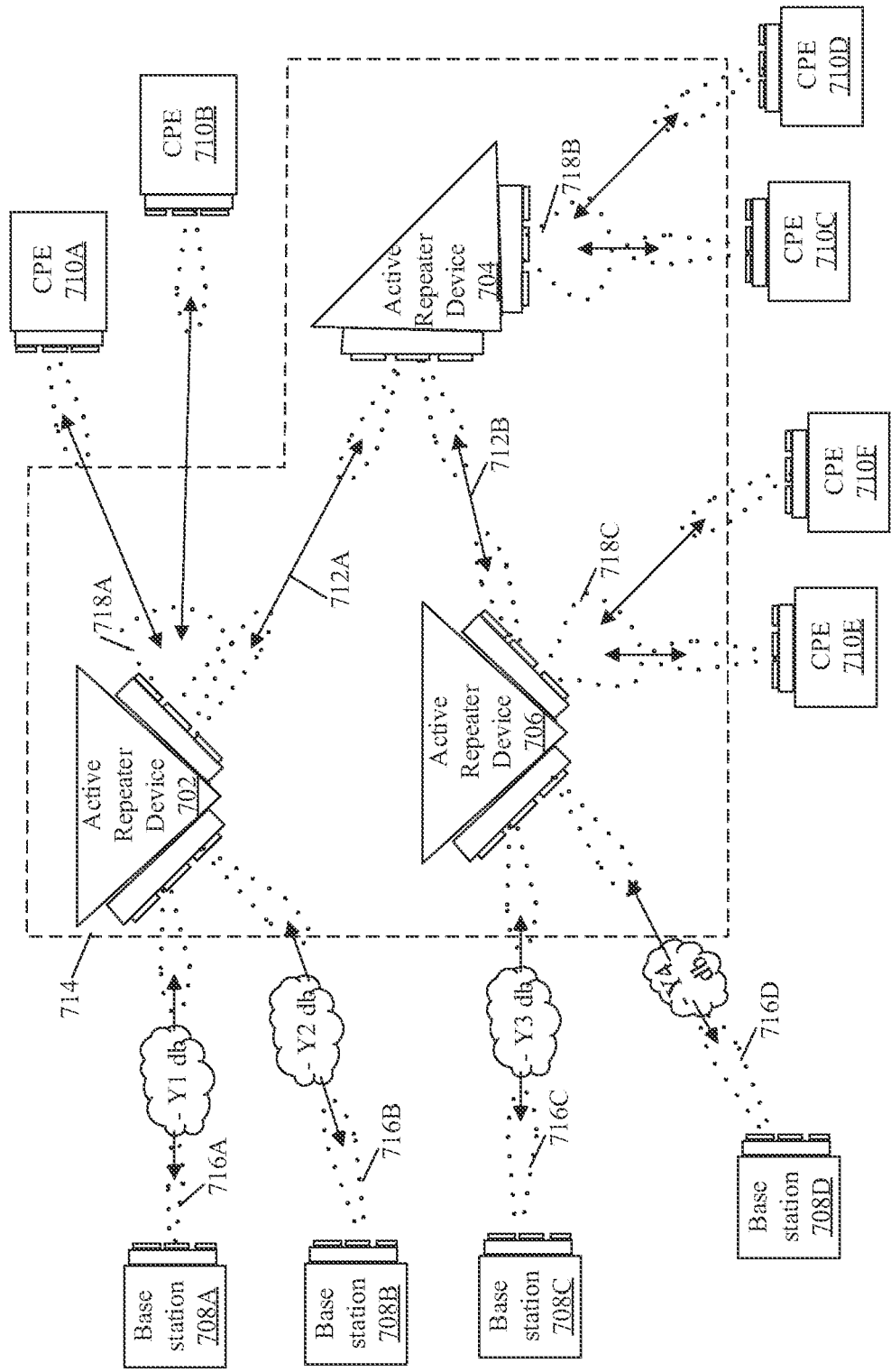
FIG. 7 illustrates an exemplary scenario for implementation of a network of active repeater devices, in accordance with an exemplary embodiment of the disclosure.

FIG. 7 depicts an exemplary scenario for implementation of an exemplary network of active repeater devices to facilitate communication between multiple service providers and CPEs, in accordance with an exemplary embodiment of the disclosure. FIG. 7 is explained in conjunction with elements from FIGS. 1A to 1C, 2A to 2C, 3, 4 5A to 5D, 6A, and 6B. With reference to FIG. 7, there is shown the exemplary scenario 700 comprising a plurality of active repeater devices 702, 704, and 706, a plurality of base stations 708A, 708B, 708C, and 708D, and a plurality of CPEs 710A, 710B, 710C, 710D, 710E, and 710F.

Each of the plurality of active repeater devices 702, 704, and 706 may correspond to the active repeater device 102

(FIG. 1). The plurality of base stations 708A, 708B, 708C, and 708D may correspond to the plurality of base stations 104 (FIG. 1). The plurality of CPEs 710A, 710B, 710C, 710D, 710E, and 710F may correspond to the plurality of CPEs 106A to 106J (FIG. 1). The plurality of active repeater devices 702, 704, and 706 may comprise a first active repeater device 702, a second active repeater device 704, and a third active repeater device 706. The plurality of base stations 708A, 708B, 708C, and 708D may comprise a first base station 708A, a second base station 708B, a third base station 708C, and a fourth base station 708D. The plurality of CPEs 710A, 710B, 710C, 710D, 710E, and 710F may comprise a first CPE 710A, a second CPE 710B, a third CPE 710C, a fourth CPE 710D, a fifth CPE 710E, and a sixth CPE 710E.

In accordance with an embodiment, the plurality of active repeater devices 702, 704, and 706 may be communicatively coupled with each other via one or more beamformed radio frequency (RF) links 712A and 712B. For example, the first active repeater device 702 may communicate with the second active repeater device 704 via a first beamformed link 712A. Similarly, the second active repeater device 704 may communicate with the third active repeater device 706 via a second beamformed link 712B.

In some embodiments, the plurality of active repeater devices 702, 704, and 706 may be interconnected with each other in accordance with various wireless communication protocols. Examples of such wired and wireless communication protocols may include, but are not limited to, at least one of a Transmission Control Protocol and Internet Protocol (TCP/IP), IEEE 802.11 protocol, multi-hop communication, various cellular communication protocols, or a combination or variants thereof. In accordance with an embodiment, the first active repeater device 702 concurrently provides coverage to the second active repeater device 704 and the first CPE 710A and the second CPE 710B. The second active repeater device 704 concurrently provides coverage to the third active repeater device 706, the third CPE 710C and the fourth CPE 710D. The plurality of active repeater devices 702, 704, and 706 which are communicatively coupled to each other, may be collectively referred to as a network of active repeater devices 714.

In accordance with an embodiment, each active repeater device (e.g. the active repeater device 102 (FIG. 1)) of the network of active repeater devices 714 may comprise a first antenna array (e.g. the first antenna array 304 (FIG. 3)). The first antenna array may be configured to concurrently receive a plurality of beams 716A, 716B, 716C, and 716D of input RF signals from the plurality of base stations 708A, 708B, 708C, and 708D. The plurality of beams 716A, 716B, 716C, and 716D of input RF signals may correspond to the plurality of beams 114 of input RF signals (FIG. 1).

The plurality of base stations 708A, 708B, 708C, and 708D may be associated with a plurality of different service providers. The active repeater device 102 may be configured to serve the plurality of different service providers. The first antenna array of the may receive the plurality of beams 716A, 716B, 716C, and 716D of input RF signals from the plurality of base stations 708A, 708B, 708C, and 708D via the network of active repeater devices 714. The plurality of beams 716A, 716B, 716C, and 716D of input RF signals may comprise a first beam 716A of input RF signals (from the first base station 708A), a second beam 716B of input RF signals (from the second base station 708B), a third beam 716C of input RF signals (from the third base station 708C), and a fourth beam 716D of input RF signals (from the fourth base station 708D).

In the exemplary scenario, one or more of the plurality of base stations 708A, 708B, 708C, and 708D may be outside of a transmission range of one or more of the plurality of active repeater devices 702, 704, and 706. In certain scenarios, the plurality of base stations 708A, 708B, 708C, and 708D may be outside of a transmission range of the second active repeater 704. In such scenarios, the second active repeater 704 may receive the plurality of beams 716A, 716B, 716C, and 716D via the first active repeater device 702 and the third active repeater device 706 of the network of active repeater devices 714.

The second active repeater device 704 may receive the first beam 716A of input RF signals from the first base station 708A via the first active repeater device 702. For example, the first active repeater device 702 may receive the first beam 716A of input RF signals from the first base station 708A. The first active repeater device 702 may further re-transmit the first beam 716A of input RF signals to the second active repeater 704 via the first beam formed link 712A. Similarly, the second active repeater device 704, may receive the fourth beam 716D of input RF signals via the third active repeater device 706. The third active repeater device 706 may receive the fourth beam 716D from the fourth base station 708D. The third active repeater device 706 may further re-transmit the fourth beam 716D of input RF signals to the second active repeater 704 via the second beam formed link 712D. Similarly, each active repeater device of the network of active repeater devices 714 may be configured to receive the plurality of beams 716A, 716B, 716C, and 716D from the plurality of base stations 708A, 708B, 708C, and 708D via the network of active repeater devices 714.

In accordance with an embodiment, each active repeater device (e.g. the active repeater device 102 (FIG. 1)) of the network of active repeater devices 714 may comprise a second antenna array (e.g. the second antenna array 332 (FIG. 3)). The second antenna array of each of the plurality of active repeater devices 702, 704, and 706 may be configured to concurrently transmit a plurality of beams 718A, 718B, and 718C of output RF signals to the plurality of CPEs 710A, 710B, 710C, 710D, 710E, and 710F via the network of active repeater devices 714. The plurality of beams 718A, 718B, and 718C of output RF signals may correspond to the plurality of beams 110 of output RF signals. The plurality of beams 718A, 718B, and 718C of output RF signals may comprise a first beam 718A of output RF signals, a second beam 718B of output RF signals, and a third beam 718C of output RF signals. The first active repeater device 702 may be configured to transmit the first beam 718A of output RF signals to the first CPE 710A and the second CPE 710B. The second active repeater device 704 may be configured to transmit the second beam 718B of output RF signals to the third CPE 710C and the fourth CPE 710D. The third active repeater device 706 may be configured to transmit the third beam 718C of output RF signals to the fifth CPE 710E and the sixth CPE 710F.

In the exemplary scenario, one or more of the plurality of CPEs 710A, 710B, 710C, 710D, 710E, and 710F may be outside of a transmission range of one or more of the plurality of active repeater devices 702, 704, and 706. For example, the first CPE 710A may be outside of a transmission range of the third active repeater device 706. In such scenarios, the third active repeater device 706 may be configured to transmit one or more of the plurality of beams 716A, 716B, 716C, and 716D of input RF signals to the first CPE 710A via the second active repeater device 704 and the first active repeater device 702.

The third active repeater device 706 may receive the fourth beam 716D of input RF signals from the fourth base station 708D. The third active repeater device 706 may retransmit the fourth beam 716D of input RF signals to the second active repeater device 704 via the second beam formed link 712B. The second active repeater device 704 may retransmit the fourth beam 716D of input RF signals to the first active repeater device 702 via the first beam formed link 712A. The first active repeater device 702 may be configured to generate the first beam 718A of output RF signals based on the received fourth beam 716D of input RF signals. The first active repeater device 702 may be configured to transmit the first beam 718A of output RF signals to the first CPE 710A. Hence, the third active repeater device 706 may be configured to communicate with the first CPE 710A via the network of active repeater devices 714. Similarly, each active repeater device of the network of active repeater devices 714 may be configured to communicate with the plurality of CPEs 710A, 710B, 710C, 710D, 710E, and 710F via the network of active repeater devices 714.

Figure 8A:
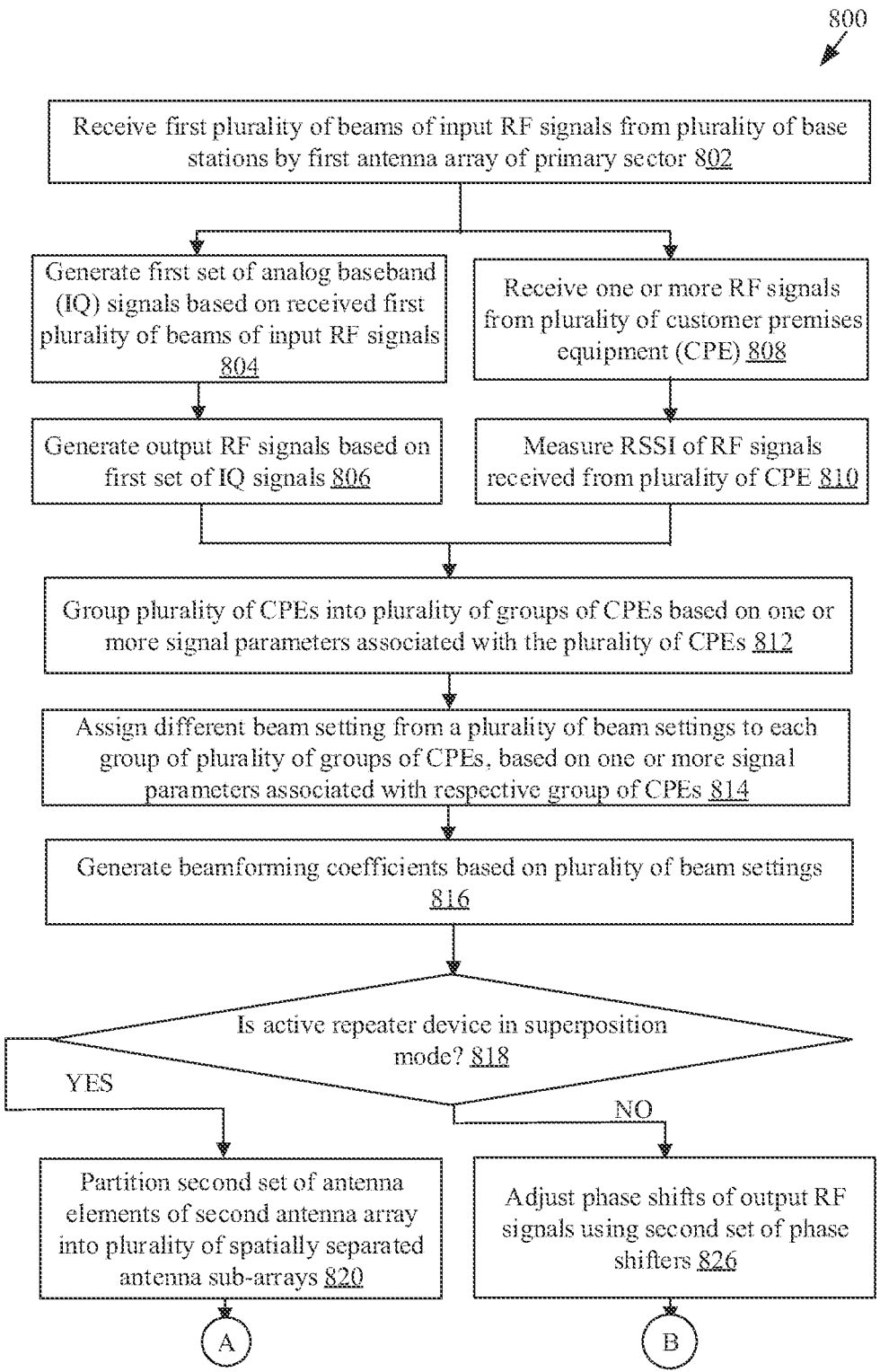
FIGS. 8A and 8B, collectively, depict a flow chart that illustrates an exemplary method of operating an exemplary active repeater device to facilitate communication with CPEs, in accordance with an embodiment of the disclosure.
Figure 8B:
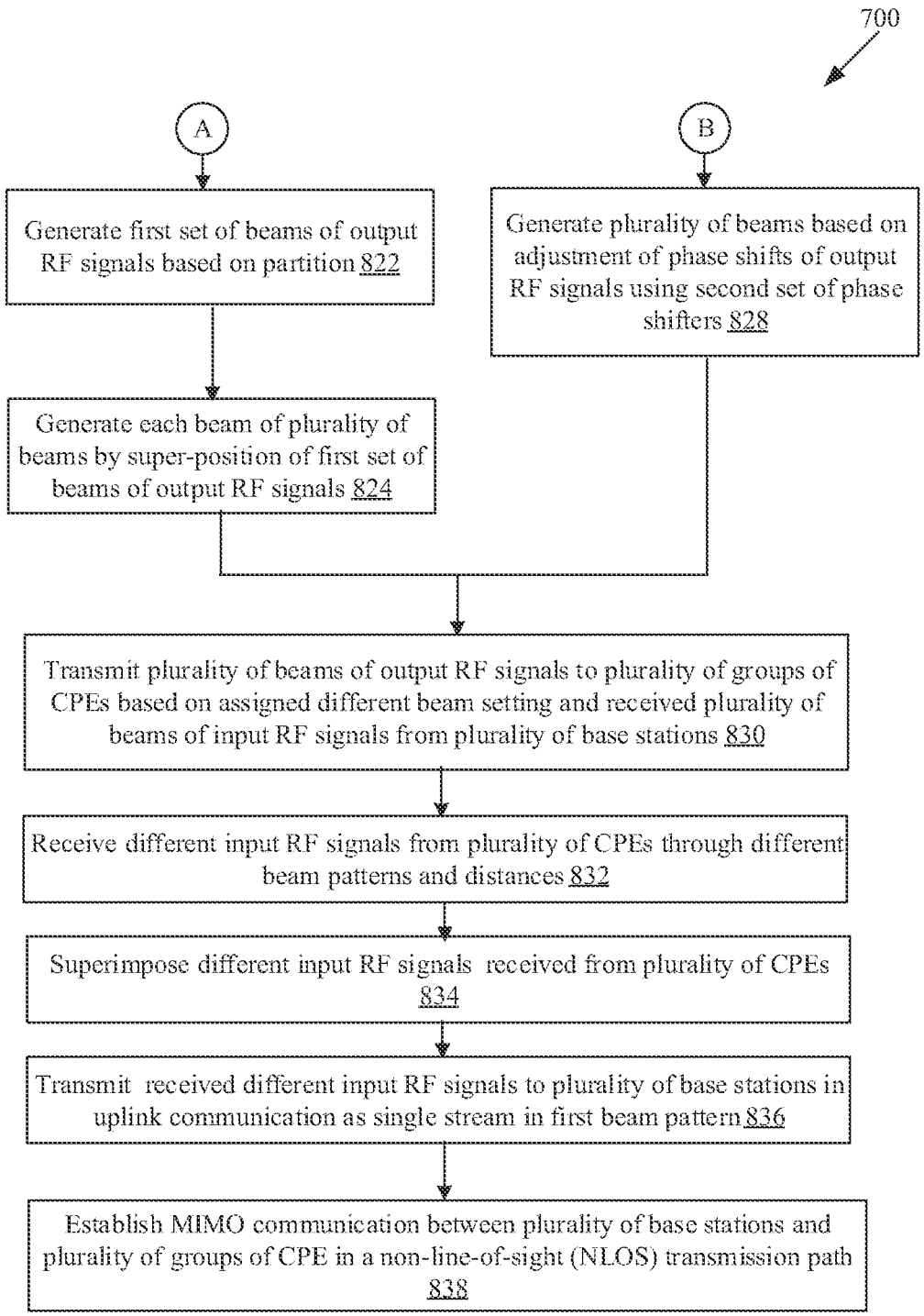

FIGS. 8A and 8B, collectively, depict a flow chart that illustrates an exemplary method of operating an active repeater device, in accordance with an embodiment of the disclosure. With reference to FIG. 8A, there is shown a flow chart 800. The flow chart 800 is described in conjunction with FIGS. 1A to 1B, 1C, 2A to 2C, 3, 4, 5A to 5D, 6A, 6B, and 7. Referring to FIG. 8A, there is shown a flow chart 800 comprising exemplary operations 802 through 838.

At 802, a first plurality of beams of input RF signals (e.g. the plurality of beams of input RF signals 114 (FIG. 1)) may be received by a first antenna array (e.g. the first antenna array 304) in the first RH unit 204 of the primary sector 202. In certain scenarios, the first plurality of beams of input RF signals having the first beam pattern 610 may be received from the plurality of base stations 104. The plurality of base stations 104 may be associated with a plurality of different service providers. The first plurality of beams of input RF signals may include a full-bandwidth signal intended for the plurality of CPEs 106A to 106J. One or more operations 804 and 806 may be executed concurrently to one or more operations 808 and 810, as shown. Therefore, the control may pass concurrently to 804 and 808.

At 804, the first set of analog baseband (IQ) signals may be generated based on the received first plurality of beams of input RF signals. The first RH unit 204 in the primary sector 202 may be configured to generate the first set of IQ signals. The first RH unit 204 may down convert the input RF signals to generate the first set of IQ signals. The first set of IQ signals may be received by the baseband signal processor 206 in the primary sector 202. The first set of IQ signals received from the first RH unit 204 may be converted to a first set of coded data signals by the baseband signal processor 206. The baseband signal processor 206 unit may be configured to convert the first set of coded data signals to the second set of IQ signals using the first set of DACs 414.

At 806, one or more output RF signals may be generated based on the first set of IQ signals. The one or more output RF signals may be generated by a second RH unit (such as the second RH unit 210 and the second RH unit 214). The second RH unit 210 may be configured to up convert the second set of IQ signals to generate the one or more output RF signals.

At 808, one or more RF signals may be received by the active repeater device 102 from the plurality of CPEs 106A to 106J. The active repeater device 102 may be configured to receive different input RF signals from the plurality of CPEs 106A to 106J through different beam patterns and distances.

At 810, RSSI of the one or more RF signals received from each of the plurality of CPEs 106A to 106J may be measured. The RSSI may be measured in the digital domain. The baseband signal processor 206 may be configured to measure the RSSI in digital domain using the second controller 404. Further, the second controller 404 may be configured to detect a location of each of the plurality of CPEs 106A to 106J based on the measured RSSI.

At 812, the plurality of CPEs 106A to 106J may be grouped into the plurality of groups of CPEs 112 based on one or more signal parameters associated with the plurality of CPEs 106A to 106J. The second controller 404 may be configured to classify the plurality of CPEs 106A to 106J into the plurality of groups of CPEs 112 based on the measured RSSI of the plurality of CPEs 106A to 106J. In other embodiments, the second controller 404 may be configured to classify the plurality of CPEs 106A to 106J into the plurality of groups of CPEs 112 based on location of the plurality of CPEs 106A to 106J. For example, the active repeater device 102 may be configured to classify the first CPE 106A and the second CPE 106B into the first group of CPEs 112A of the plurality of groups of CPEs 112. In some embodiments, the grouping or the classification is based on an association (a subscription or registration) of a CPE with a particular service provider. Thus, the CPEs that belong to a particular service provider may be grouped together. The measured RSSI associated with the plurality of CPEs 106A to 106J, in combination with the location or a distance of each of the plurality of CPEs 106A to 106J may be also referred to as the one or more signal parameters associated with the plurality of groups of CPEs 112.

At 814, a different beam setting from the plurality of beam settings may be assigned to each of the plurality of groups of CPEs 112, based on the one or more signal parameters associated with the plurality of groups of CPEs 112. Each of the plurality of beam settings may correspond to a different beam profile of the plurality of beams 110 of output RF signals. Each of the plurality of beam settings comprises a set of beamforming coefficients. In accordance with an embodiment, the active repeater device 102 may be configured to assign a first set of beam settings (comprising a first beam setting, a second beam setting, a third beam setting, and a fourth beam setting) to the plurality of groups of CPEs 112. For example, the first beam setting, the second beam setting, the third beam setting, and the fourth beam setting of the plurality of beam settings, may be assigned to the first group of CPEs 112A, the second groups of CPEs 112B, the third group of CPEs 112C, and the fourth group of CPEs 1112D of the plurality of groups of CPEs 112 respectively. The active repeater device 102 may be configured to assign the first set of beam settings to the plurality of groups of CPEs 112 for a first timeslot "Ts1" of a plurality of available timeslots in a transmission time period of a time division multiple access (TDMA) scheme. Similarly, the active repeater device 102 may be configured to assign a second set of beam settings, a third set of beam settings, and a fourth set of beam settings to the plurality of groups of CPEs 112 for a second timeslot "Ts2", a third timeslot "Ts3", and a fourth timeslot "Ts4" respectively.

At 816, beamforming coefficients may be generated based on the plurality of beam settings. The second controller 404 in the baseband signal processor 206 may be configured to generate the beamforming coefficients based on the detected location of each of the plurality of CPEs 106. In other embodiments, the second controller 404 may be configured to acquire the beamforming coefficients from the memory 406 of the baseband signal processor 206 based on the plurality of beam settings.

At 818, it may be determined whether a beamforming mode of the active repeater device 102 is a superposition mode. The beamforming mode of the active repeater device 102 may be checked by the second controller 404. In cases where the beamforming mode is the superposition mode, the control passes to step 820. In cases where the beamforming mode is a phase-only excitation mode, the control passes to step 826.

At 820, the second set of antenna elements of the second antenna array 332 may be partitioned into a plurality of spatially separated antenna sub-arrays. The second controller 404 of the baseband signal processor 206 may partition the second antenna array 332 into the plurality of spatially separated antenna sub-arrays. In one example, the second set of antenna elements may comprise 256 elements. Further, each of the plurality of spatially separated antenna sub-arrays may comprise 64 elements each. An example of the partitioning is shown in FIG. 5A.

At 822, the first set of beams of RF output signals may be generated based on the partition. The second antenna array (e.g. the second antenna array 332) of the first RH unit 204, the second RH unit 210 or the second RH unit 214 may be configured to generate the first set of beams of RF output signals. Each of the first set of beams may be generated by a corresponding antenna sub-array in the plurality of spatially separated antenna sub-arrays. An example of the first set of beams of RF output signals by partitioning is shown in FIG. 5B.

At 824, each beam of the plurality of beams 110 of output RF signals may be generated based on superposition of the first set of beams of RF output signals. Each beam of the plurality of beams 110 of output RF signals may have the second beam pattern 612. An example of the generation of the second beam pattern 612 by superposition of the first set of beams of RF output signals is shown and described in FIGS. 5A and 6A.

At 826, phase shifts of the output RF signals may be adjusted. A first controller (e.g., the first controller 322) of the first RH unit 204, the second RH unit 210 or the second RH unit 214 may be configured to adjust phase shifts of the output RF signals using the second set of phase shifters (e.g. the second set of phase shifters 328) of the second RH unit 210 or the second RH unit 214. In certain scenarios, phase shifts of output RF signals may be adjusted based on a quadratic phase distribution scheme. Further, the phase shifts of the output RF signals may be adjusted based on the generated beamforming coefficients.

At 828, each beam of the plurality of beams 110 of output RF signals may be generated based on the adjustment of phase shifts of the output RF signals. The second antenna array (e.g. the second antenna array 332) in the one or more secondary sectors (such as the secondary sector 208, 212, 604, 606, or 608) may be configured to generate the second beam pattern 612. The second beam pattern 612 may be generated by the cascading transmitter chain (e.g. the cascading transmitter chain 336) in the one or more secondary sectors (such as the secondary sector 208, and the secondary sector 212).

At 830, each beam of the plurality of beams 110 of the output RF signals may be transmitted to the plurality of groups of CPEs 112 based on the assigned different beam setting and received plurality of beams of input RF signals from the plurality of base stations. The second antenna array (e.g. the second antenna array 332) in the one or more secondary sectors (such as the secondary sector 208, and the secondary sector 212) may be configured to generate each beam of the plurality of beams 110 in the second beam pattern 612 based on the generated beamforming coefficients and the received plurality of beams 114 of input RF signals. The full-bandwidth signal received from the plurality of base stations 104 may be re-transmitted concurrently to the plurality of groups of CPEs over the plurality of beams of output RF signals.

At 832, different input RF signals from the plurality of groups of CPE 112 may be received by through different beam patterns and distances. The first antenna array (e.g. the first antenna array 304) in the primary sector 202 and the one or more secondary sectors (such as the secondary sector 208, and the secondary sector 212) may be configured to receive different input RF signals from the plurality of groups of CPEs 112. An example of receipt of different input RF signals from the plurality of groups of CPEs 112 through different beam patterns and distances, is shown in FIG. 6A.

At 834, the received different input RF signals from the plurality of groups of CPEs 112 may be superimposed. The received different input RF signals may be superimposed as a single stream, one stream each for one base station. The primary sector 202 may be configured to superimpose the received different input RF signals as the single stream having the first beam pattern 610 for uplink transmission. The single stream may include full frequency channel that corresponds to the different input RF signals received from the plurality of groups of CPEs 112.

At 836, the superimposed input RF signals may be transmitted to the plurality of base station 104 in an uplink communication as a single stream in the first beam pattern 610. In this regard, the superimposed input RF signals may be transmitted to the plurality of base station 104 in an uplink communication as a single stream in the first beam pattern 610 by the second antenna array (e.g. the second antenna array 332) in the primary sector 202. An example of transmission of the superimposed input RF signals to the plurality of base station 104 in an uplink communication in the first beam pattern 610 by the second antenna array (e.g. the second antenna array 332) in the primary sector 202, is shown in FIG. 6B.

At 838, a MIMO based communication may be established between the plurality of base stations 104 and the plurality of groups of CPEs 112 in an NLOS transmission path. The active repeater device 102 may be configured to establish the MIMO based communication. The MIMO based communication may be established based on the receipt of the first beam of input RF signals having the first beam pattern 610 from the base station 104 and transmission of each beam of plurality of beams 110 of output RF signals in the second beam pattern to the plurality of CPEs 106.

Figure 9A:
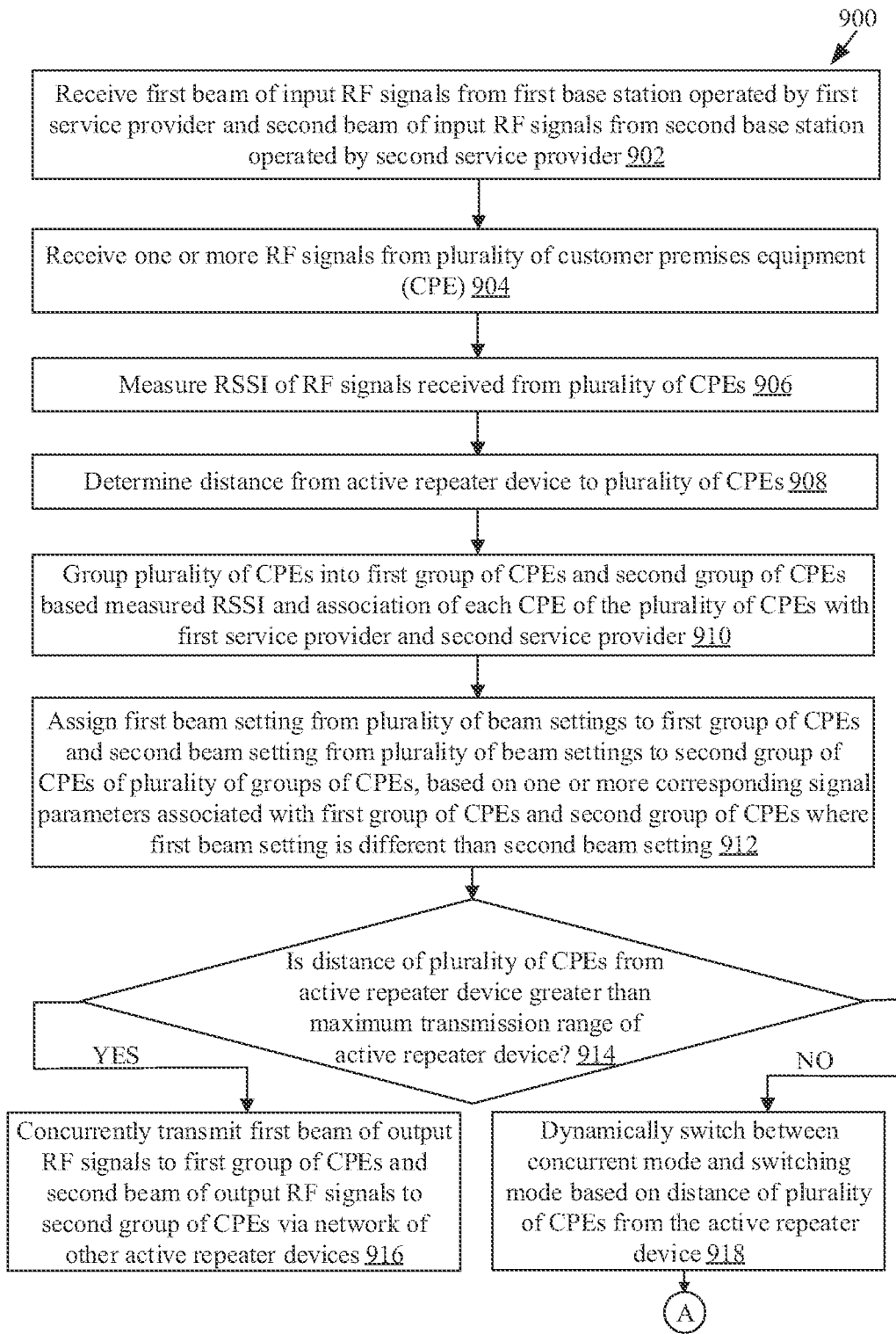
FIGS. 9A and 9B, collectively, depict a flow chart that illustrates exemplary operations in an exemplary active repeater device to facilitate communication with CPEs, in accordance with an embodiment of the disclosure.
Figure 9B:
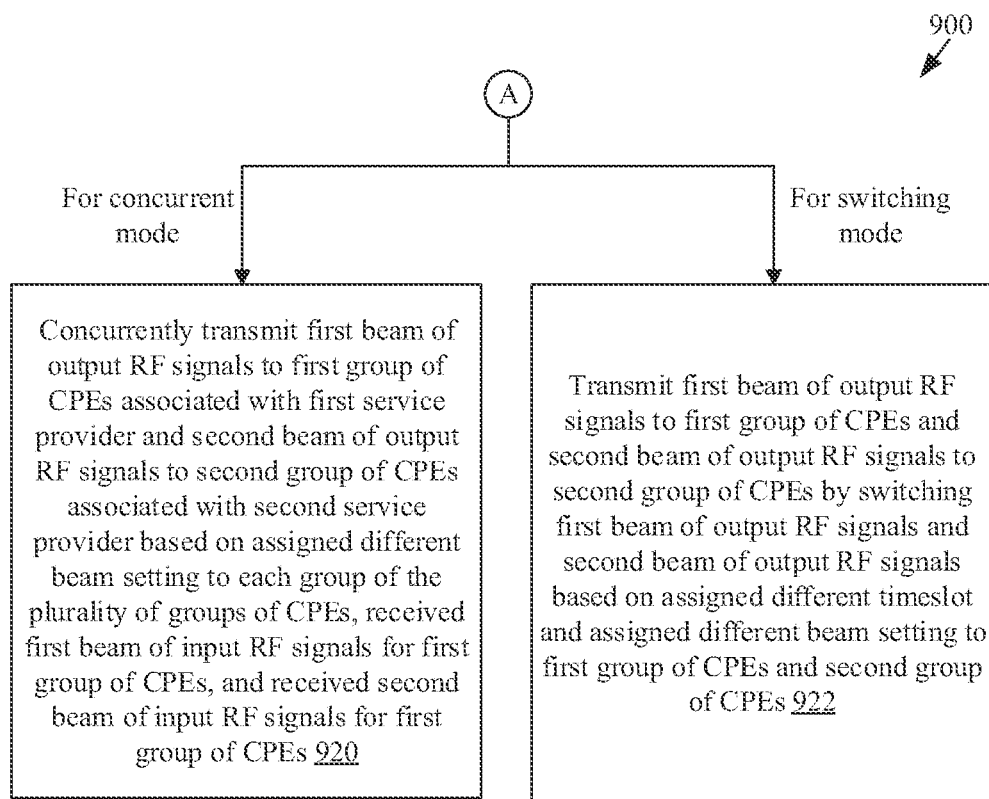

FIGS. 9A and 9B, collectively, depict a flow chart that illustrates exemplary operations in an exemplary active repeater device, in accordance with an embodiment of the disclosure. With reference to FIGS. 9A and 9B, there is shown a flow chart 900. The flow chart 900 is described in conjunction with FIGS. 1A to 1B, 1C, 2A to 2C, 3, 4, 5A to 5D, 6A, 6B, and 7. The flow chart 800 comprises exemplary operations 902 through 922.

At 902, a first beam of input RF signals from a first base station (e.g., the first base station 104A operated by a first service provider and a second beam of input RF signals from a second base station (e.g., the second base station 104B) operated by a second service provider, may be received. The first antenna array 304 of the first RH unit 204 of the primary sector 202 may be configured to receive the first beam of input RF signals from the first base station 104A operated by the first service provider and the second beam of input RF signals from the second base station 104B operated by the second service provider.

At 904, one or more RF signals may be received from plurality of CPEs 106A to 106J. The active repeater device 102 may be configured to receive different input RF signals from the plurality of CPEs 106A to 106J through different beam patterns and distances.

At 906, RSSI of the one or more RF signals received from each of the plurality of CPEs 106A to 106J may be measured. The baseband signal processor 206 may be configured to measure the RSSI in digital domain using the second controller 404.

At 908, a distance from the active repeater device 102 to the plurality of CPEs 106A to 106J may be determined. The second controller 404 may be configured to detect a location of each of the plurality of CPEs 106A to 106J based on the measured RSSI, and accordingly determine corresponding distances from the active repeater device 102 to each of the plurality of CPEs 106A to 106J.

At 910, the plurality of CPEs 106A to 106J may be grouped into the first group of CPEs 112A and the second group of CPEs 112B of the plurality of groups of CPEs 112, based on the measured RSSI and an association of each CPE of the plurality of CPEs 106A to 106J, with either the first service provider or the second service provider. In some cases, one CPE may be associated with both the first service provider or the second service provider. The second controller 404 may be configured to classify the plurality of CPEs 106A to 106J into the plurality of groups of CPEs 112 based on the measured RSSI of the plurality of CPEs 106A to 106J, and association with corresponding service provider.

At 912, a first beam setting from a plurality of beam settings may be assigned to the first group of CPEs 112A and a second beam setting from the plurality of beam settings may be assigned to the second group of CPEs 112B of the plurality of groups of CPEs 112, based on one or more corresponding signal parameters associated with the first group of CPEs 112A and the second group of CPEs 112B and the grouping. The first beam setting may be different from the second beam setting.

At 914, it may be determined whether the distance of the plurality of CPEs 106A to 106J from the active repeater device 102 is greater than a maximum transmission range of the active repeater device. In cases where the distance of the plurality of CPEs or one or more CPEs of the plurality of CPEs 106A to 106J, is greater than the maximum transmission range of the active repeater device 102, the control passes to 916, or else to 918.

At 916, the first beam of output RF signals and the second beam of output RF signals may be concurrently transmitted to the first group of CPEs 112A and to the second group of CPEs 112B via a network of other active repeater devices. One or both of the first base station 104A and the second base station 104B and one or more CPEs of the plurality of groups of CPEs 12 may be are located at a distance greater than the maximum transmission range of the active repeater device 102.

At 918, a dynamic switching may be executed between a concurrent multi-beam mode (also simply referred to as concurrent mode) and a multi-beam switching mode (also simply referred to as switching mode) based on distances of the plurality of CPEs 106A to 106J from the active repeater 102

At 920, for the concurrent multi-beam mode, a first beam of output RF signals may be concurrently transmitted to the first group of CPEs 112A associated with the first service provider and second beam of output RF signals to the second group of CPEs 112B associated with the second service provider based on the assigned different beam setting to each group of the plurality of groups of CPEs 112, the received first beam of input RF signals for the first group of CPEs 112A, and the received second beam of input RF signals for the second group of CPEs 112B. A second antenna array of the second RH unit may be configured to execute the concurrent transmission.

At 922, for the multi-beam switching mode, the first beam of output RF signals and may be transmitted to the first group of CPEs 112A and the second beam of output RF signals to the second group of CPEs 112B respectively by switching the first beam of output RF signals and the second beam of output RF signals based on assigned different timeslot and the assigned different beam setting to the first group of CPEs 112A and the second group of CPEs 112B. The first full-bandwidth signal received from the first base station 104A is re-transmitted to the first group of CPEs 112A over the first beam of output RF signals. Similarly, the second full-bandwidth signal received from the second base station 104B is re-transmitted to the second group of CPEs 112B over the second beam of output RF signals.

Various embodiments of the disclosure may provide a non-transitory computer-readable medium having stored thereon, computer implemented instruction that when executed by one or more circuits' causes an active repeater device to receive a first plurality of beams of input RF signals from a plurality of base stations. A different beam setting from a plurality of beam settings may be assigned to each of a plurality of groups of CPEs, based on one or more signal parameters associated with the plurality of groups of CPEs. A second plurality of beams of output RF signals may be transmitted to the plurality of groups of CPEs based on the assigned different beam setting to each group of the plurality of groups of CPEs and the received first plurality of beams of input RF signals.

In accordance with an embodiment, the active repeater device 102 may include a primary sector that includes a baseband signal processor and a first radio head (RH) unit. A first antenna array of the first RH unit may be configured to receive a first beam of input RF signals from a first base station operated by a first service provider and a second beam of input RF signals from a second base station operated by a second service provider. A controller of the baseband signal processor may be configured to assign a first beam setting from a plurality of beam settings to a first group of customer premises equipment (CPEs) and a second beam setting from the plurality of beam settings to a second group of CPEs of a plurality of groups of CPEs, based on one or more corresponding signal parameters associated with the first group of CPEs and the second group of CPEs, wherein the first beam setting is different than the second beam setting. The active repeater device 102 may also include at least a secondary sector that is communicatively coupled to the primary sector and includes a second RH unit. A second antenna array of the second RH unit may be configured to concurrently transmit a first beam of output RF signals to the first group of CPEs associated with the first service provider and a second beam of output RF signals to the second group of CPEs associated with the second service provider, based on the assigned different beam setting to each group of the plurality of groups of CPEs, the received first beam of input RF signals for the first group of CPEs, and the received second beam of input RF signals for the second group of CPEs.

In accordance with an embodiment, the first antenna array may be further configured to concurrently receive the first beam of input RF signals and the second beam of input RF signals via a network of other active repeater devices, where the second antenna array may be further configured to concurrently transmit the first beam of output RF signals to the first group of CPEs and the second beam of output RF signals to the second group of CPEs via the network of other active repeater devices. One or both of the first base station and the second base station and one or more CPEs of the plurality of groups of CPEs may be located at a distance greater than a maximum transmission range of the active repeater device.

In accordance with an embodiment, the one or more signal parameters corresponds to received signal strength indicator (RSSI) associated with the plurality of groups of CPEs that indicates a location or a distance of each group of the plurality of groups of CPEs from the active repeater device. The active repeater device 102 may also include a plurality of second antenna arrays including the second antenna array of the second RH unit, where the first beam of input RF signals includes a first full-bandwidth signal intended for the first group of CPEs. The second beam of input RF signals includes a second full-bandwidth signal intended for the second group of CPEs. The plurality of second antenna arrays are configured to transmit the first beam of output RF signals to the first group of CPEs and the second beam of output RF signals to the second group of CPEs by switching the first beam of output RF signals and the second beam of output RF signals based on assigned different timeslot and the assigned different beam setting to the first group of CPEs and the second group of CPEs, In accordance with an embodiment, the first full-bandwidth signal received from the first base station may be re-transmitted to the first group of CPEs over the first beam of output RF signals, and where the second full-bandwidth signal received from the second base station is re-transmitted to the second group of CPEs over the second beam of output RF signals. Each of the plurality of beam settings correspond to a different beam profile of the plurality of different beams transmitted by the second antenna array in the second RH unit.

In accordance with an embodiment, the active repeater device may also include a memory configured to store a database comprising the plurality of beam settings, wherein each of the plurality of beam settings comprises a set of beamforming coefficients. The first antenna array may include a first set of antenna elements and the second antenna array includes a second set of antenna elements, where the controller may be further configured to partition the second set of antenna elements of the second antenna array into a plurality of spatially separated antenna sub-arrays. The second antenna array may be configured to generate a plurality of beams of output RF signals based on the partition, and wherein the first beam of output RF signals is generated by super-position of a first set of beams of output RF signals from the plurality of beams of output RF signals with each other, and wherein the second beam of output RF signals is generated by the super-position of a second set of beams of output RF signals from the plurality of beams of output RF signals with each other.

In accordance with an embodiment, the second RH unit further may include a cascading transmitter chain that includes a second set of power dividers, a second set of phase shifters, a second set of power amplifiers, and the second antenna array that includes a second set of antenna elements. The controller may be further configured to adjust phase shifts of output RF signals using the second set of phase shifters to generate the first beam of output RF signals and the second beam of output RF signals, based on a predefined criteria, wherein the first beam of output RF signals and the second beam of output RF signals have a second beam pattern generated based on the adjustment of the phase shifts of the output RF signals using the second set of phase shifters independent of changes in amplitude of the output RF signals. The second beam pattern may be wider than a first beam pattern of the first beam of input RF signals and the second beam of input RF signals.

In accordance with an embodiment, the controller may be further configured to adjust phase shifts of output RF signals using the second set of phase shifters to generate the first beam of output RF signals and the second beam of output RF signals, based on a quadratic phase distribution scheme. The primary sector and each of one or more secondary sectors that includes the at least secondary sector of the active repeater device, after installation at a defined location, may be configured to cover a portion of a 360-degree scan range for communication among a plurality of base stations including the first base station and the second base station, the plurality of groups of CPEs, or another active repeater device.

In accordance with an embodiment, the active repeater device 102 may be further configured to a plurality of first antenna arrays, where the plurality of first antenna arrays may be further configured to receive different input RF signals from different CPEs of the plurality of groups of CPEs through different beam patterns and distances. The received different input RF signals from the different CPEs are superimposed by the primary sector and transmitted to a corresponding base station and the in an uplink communication as a single stream with a first beam pattern. The single stream includes full frequency channel that corresponds to the different input RF signals received from at least one group of CPEs of the plurality of groups of CPEs. The baseband signal processor may be configured to support multi-band millimeter wave (mm Wave) spectrum and sub-30 GHz spectrum concomitantly.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. An active repeater device, comprising:
   a primary sector that includes a baseband signal processor and a first radio head (RH) unit, wherein
      a first antenna array of the first RH unit is configured to receive a first beam of input RF signals from a first base station operated by a first service provider and a second beam of input RF signals from a second base station operated by a second service provider or transmit the first beam of input RF signals to the first base station and the second beam of input RF signals to the second base station;
      a controller of the baseband signal processor is configured to assign a first beam setting from a plurality of beam settings to a first group of customer premises equipment (CPEs) of a plurality of groups of CPEs and a second beam setting from the plurality of beam settings to a second group of CPEs of the plurality of groups of CPEs,
      wherein the first beam setting is different than the second beam setting; and
   at least a secondary sector that is communicatively coupled to the primary sector and includes a second RH unit, wherein
      a second antenna array of the second RH unit is configured to concurrently transmit a first beam of output RF signals to the first group of CPEs associated with the first service provider and a second beam of output RF signals to the second group of CPEs associated with the second service provider or receive the first beam of output RF signals from the first group of CPEs and the second beam of output RF signals from the second group of CPEs,
      wherein the first beam of output RF signals and the second beam of output RF signals are transmitted or received based on the first beam setting during a first timeslot or the second beam setting during a second timeslot, and
      wherein the first timeslot is different from the second timeslot.

2. The active repeater device of claim 1, wherein the first antenna array is further configured to concurrently receive the first beam of input RF signals and the second beam of input RF signals via a network of other active repeater devices,
   wherein the second antenna array is further configured to concurrently transmit the first beam of output RF signals to the first group of CPEs and the second beam of output RF signals to the second group of CPEs via the network of other active repeater devices, and
   wherein one or both of the first base station and the second base station and one or more CPEs of the plurality of groups of CPEs are located at a distance greater than a maximum transmission range of the active repeater device.

3. The active repeater device of claim 1, wherein the first beam setting and the second beam setting are assigned based on one or more corresponding signal parameters associated with the first group of CPEs and the second group of CPEs,
   wherein the one or more signal parameters corresponds to received signal strength indicator (RSSI) associated with the plurality of groups of CPEs,
      wherein the RSSI indicates a location or a distance of each group of the plurality of groups of CPEs from the active repeater device.

4. The active repeater device of claim 1, further comprising a plurality of second antenna arrays including the second antenna array of the second RH unit,
   wherein the first beam of input RF signals includes a first full-bandwidth signal intended for the first group of CPEs,
   wherein the second beam of input RF signals includes a second full-bandwidth signal intended for the second group of CPEs, and
   wherein the plurality of second antenna arrays are configured to transmit the first beam of output RF signals to the first group of CPEs and the second beam of output RF signals to the second group of CPEs by a switch of the first beam of output RF signals and the second beam of output RF signals,
   wherein the first beam of output RF signals and the second beam of output RF signals are switched based on assigned different timeslot and the first beam setting or the second beam setting.

5. The active repeater device of claim 4, wherein the first full-bandwidth signal received from the first base station is re-transmitted to the first group of CPEs over the first beam of output RF signals, and
   wherein the second full-bandwidth signal received from the second base station is re-transmitted to the second group of CPEs over the second beam of output RF signals.

6. The active repeater device of claim 1, wherein each of the plurality of beam settings correspond to a different beam profile of a plurality of different beams transmitted by the second antenna array in the second RH unit.

7. The active repeater device of claim 1, wherein the active repeater device comprises a memory configured to store a database comprising the plurality of beam settings, and
   wherein each of the plurality of beam settings comprises a set of beamforming coefficients.

8. The active repeater device of claim 1, wherein the first antenna array comprises a first set of antenna elements and the second antenna array comprises a second set of antenna elements, and
   wherein the controller is further configured to partition the second set of antenna elements of the second antenna array into a plurality of spatially separated antenna sub-arrays.

9. The active repeater device of claim 8, wherein the second antenna array is configured to generate a plurality of beams of output RF signals based on the partition, wherein the first beam of output RF signals is generated by super-position of a first set of beams of output RF signals from the plurality of beams of output RF signals with each other, and wherein the second beam of output RF signals is generated by the super-position of a second set of beams of output RF signals from the plurality of beams of output RF signals with each other.

10. The active repeater device of claim 1, wherein the second RH unit further comprises a cascading transmitter chain that includes a second set of power dividers, a second set of phase shifters, a second set of power amplifiers, and the second antenna array that includes a second set of antenna elements.

11. The active repeater device of claim 10, wherein the controller is further configured to adjust phase shifts of output RF signals using the second set of phase shifters to generate the first beam of output RF signals and the second beam of output RF signals, wherein the phase shifts of output RF signals are adjusted based on a predefined criteria, wherein the first beam of output RF signals and the second beam of output RF signals have a second beam pattern generated based on the adjustment of the phase shifts of the output RF signals using the second set of phase shifters independent of changes in amplitude of the output RF signals, and wherein the second beam pattern is wider than a first beam pattern of the first beam of input RF signals and the second beam of input RF signals.

12. The active repeater device of claim 10, wherein the controller is further configured to adjust phase shifts of output RF signals using the second set of phase shifters to generate the first beam of output RF signals and the second beam of output RF signals, wherein the phase shifts of output RF signals are adjusted based on a quadratic phase distribution scheme.

13. The active repeater device of claim 1, wherein the primary sector and the at least secondary sector of the active repeater device, after installation at a defined location, are configured to cover a portion of a 360-degree scan range for communication among a plurality of base stations including the first base station and the second base station, the plurality of groups of CPEs, or another active repeater device.

14. The active repeater device of claim 1, further comprises a plurality of first antenna arrays, wherein the plurality of first antenna arrays are further configured to receive different input RF signals from different CPEs of the plurality of groups of CPEs through different beam patterns and distances, wherein the received different input RF signals from the different CPEs are superimposed by the primary sector and the received different input RF signals are transmitted to a corresponding base station in an uplink communication as a single stream with a first beam pattern, and wherein the single stream includes full frequency channel that corresponds to the different input RF signals received from at least one group of CPEs of the plurality of groups of CPEs.

15. The active repeater device of claim 1, wherein the baseband signal processor is configured to support multi-band millimeter wave (mm Wave) spectrum and sub-30 GHz spectrum concomitantly.

16. A method, comprising:

in an active repeater device comprising a primary sector that includes a baseband signal processor and a first radio head (RH) unit, and at least a secondary sector that is communicatively coupled to the primary sector and includes a second RH unit:

receiving a first beam of input RF signals from a first base station operated by a first service provider and a second beam of input RF signals from a second base station operated by a second service provider or transmitting the first beam of input RF signals to the first base station and the second beam of input RF signals to the second base station;

assigning, by a controller of the baseband signal processor, a first beam setting from a plurality of beam settings to a first group of customer premises equipment (CPEs) of a plurality of groups of CPEs and a second beam setting from the plurality of beam settings to a second group of CPEs of the plurality of groups of CPEs, wherein the first beam setting is different than the second beam setting; and concurrently transmitting a first beam of output RF signals to the first group of CPEs associated with the first service provider and a second beam of output RF signals to the second group of CPEs associated with the second service provider or receiving the first beam of output RF signals from the first group of CPEs and the second beam of output RF signals from the second group of CPEs, wherein the first beam of output RF signals and the second beam of output RF signals are transmitted or received based on the first beam setting during a first timeslot or the second beam setting during a second timeslot, and wherein the first timeslot is different from the second timeslot.

17. The method of claim 16, wherein the first beam setting and the second beam setting are assigned based on one or more corresponding signal parameters associated with the first group of CPEs and the second group of CPEs, wherein the one or more signal parameters corresponds to received signal strength indicator (RSSI) associated with the plurality of groups of CPEs, wherein the RSSI indicates a location or a distance of each group of the plurality of groups of CPEs from the active repeater device.

18. The method of claim 16, further comprising concurrently transmitting, by a plurality of second antenna arrays, the first beam of output RF signals to the first group of CPEs and the second beam of output RF signals to the second group of CPEs by switching the first beam of output RF signals and the second beam of output RF signals, wherein the first beam of output RF signals and the second beam of output RF signals are switched based on assigned different timeslot and the first beam setting or the second beam setting.

19. The method of claim 18, wherein the first beam of input RF signals includes a first full-bandwidth signal intended for the first group of CPEs, wherein the second beam of input RF signals includes a second full-bandwidth signal intended for the second group of CPEs, wherein the first full-bandwidth signal received from the first base station is re-transmitted to the first group of CPEs over the first beam of output RF signals, and wherein the second full-bandwidth signal received from the second base station is re-transmitted to the second group of CPEs over the second beam of output RF signals.

20. The method of claim 16, further comprising storing by the controller, a database comprising the plurality of beam settings in a memory, wherein each of the plurality of beam settings comprises a set of beamforming coefficients.

\* \* \* \* \*